(12) United States Patent
Fujita et al.

(10) Patent No.: US 10,960,804 B2
(45) Date of Patent: Mar. 30, 2021

(54) VIBRATION GENERATION DEVICE AND VIBRATION GENERATION METHOD

(71) Applicant: CLARION CO., LTD., Saitama (JP)

(72) Inventors: Yasuhiro Fujita, Kashiwa (JP);
Takeshi Hashimoto, Motomiya (JP);
Kazutomo Fukue, Kitamoto (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/617,499

(22) PCT Filed: May 17, 2018

(86) PCT No.: PCT/JP2018/019158
§ 371 (c)(1),
(2) Date: Nov. 27, 2019

(87) PCT Pub. No.: WO2018/221253
PCT Pub. Date: Dec. 6, 2018

(65) Prior Publication Data
US 2020/0180484 A1 Jun. 11, 2020

(30) Foreign Application Priority Data

May 30, 2017 (JP) .............................. JP2017-106481

(51) Int. Cl.
*B60N 2/90* (2018.01)
*A47C 7/72* (2006.01)
*B06B 1/04* (2006.01)

(52) U.S. Cl.
CPC .......... *B60N 2/90* (2018.02); *B60N 2002/981* (2018.02)

(58) Field of Classification Search
CPC .... B60N 2/002; B60N 2/90; B60N 2002/981; A47C 7/72; B06B 1/045
(Continued)

(56) References Cited

U.S. PATENT DOCUMENTS 10,293,729 B2* 5/2019 Kono ........................ A47C 7/72
10,843,624 B1* 11/2020 Yamamoto ............ B60N 2/002
(Continued)

FOREIGN PATENT DOCUMENTS

| JP | 2005-280436 | 10/2005 |
| JP | 2011-48566 | 3/2011 |
| JP | 2017-19386 | 1/2017 |

OTHER PUBLICATIONS

International Search Report for corresponding International Application No. PCT/JP2018/019158, dated Aug. 7, 2018.
(Continued)

*Primary Examiner* — Shin H Kim
(74) *Attorney, Agent, or Firm* — Mori & Ward, LLP

(57) ABSTRACT

A vibration generation device (200) includes a frequency information recorder (80) configured to record frequency values of inputted measurement signals such that the frequency values are associated with measurement positions of vibrations on the seat originally generated by the vibration generator (20) on the basis of the measurement signals and transmitted to the seat by the vibration transmission member and an output signal generator (70) configured to obtain a frequency value of a measurement position corresponding to a desired position from the frequency information recorder (80) and to generate an output signal having the frequency value.

12 Claims, 11 Drawing Sheets

(58) Field of Classification Search
USPC ...................................................... 297/217.1
See application file for complete search history.

(56) References Cited

U.S. PATENT DOCUMENTS

| | | | | |
|---|---|---|---|---|
| 2007/0241595 A1* | 10/2007 | Nathan | .................... | B06B 3/00 |
| | | | | 297/217.3 |
| 2012/0101395 A1* | 4/2012 | Fujita | ...................... | A61B 5/11 |
| | | | | 600/508 |
| 2012/0299344 A1* | 11/2012 | Breed | ................ | G01G 19/4142 |
| | | | | 297/217.1 |
| 2013/0313871 A1* | 11/2013 | Shalaby | ............... | A47C 31/126 |
| | | | | 297/217.2 |
| 2015/0008710 A1* | 1/2015 | Young | ................... | B60N 2/976 |
| | | | | 297/217.3 |
| 2016/0052431 A1* | 2/2016 | Barnard | .................. | B60N 2/02 |
| | | | | 701/36 |
| 2018/0118071 A1* | 5/2018 | Sugiyama | ................ | A47C 7/62 |
| 2018/0170228 A1 | 6/2018 | Kono | | |
| 2019/0232841 A1 | 8/2019 | Kono | | |
| 2019/0241092 A1* | 8/2019 | Kyes | ....................... | B60L 58/16 |
| 2019/0300020 A1* | 10/2019 | Alexiou | .................. | H04R 3/04 |

OTHER PUBLICATIONS

Written Opinion for corresponding International Application No. PCT/JP2018/019158, dated Aug. 7, 2018.
Supplementary European Search Report for corresponding EP Application No. 18808862.9, dated May 18, 2020.

* cited by examiner

VIBRATION GENERATION DEVICE AND VIBRATION GENERATION METHOD

TECHNICAL FIELD

The present invention relates to a vibration generation device and vibration generation method and, more specifically, to a vibration generation device and vibration generation method that are able to cause a seated person to feel a vibration through a vibration transmission member that is installed inside a seat and is able to transmit a vibration in the extending direction thereof.

BACKGROUND ART

There have been proposed vehicle alarm devices that include vibrators installed inside the seating portion of a vehicle seat and give an alarm to a seated person by causing the vibrators to generate vibrations (for example, see Patent Literatures 1 and 2). Typically, the vibrators of a vehicle alarm device are disposed between the cushion and surface of the seating portion or in other positions. Even if the vehicle is traveling, the seated person is able to easily determine whether an alarm has been given, on the basis of the vibrations of the vibrators.

However, in the case of the above vehicle alarm devices, the vibrators are disposed between the cushion and surface of the seating portion and therefore the sitting comfort may be impaired, or the seated person may have a strange feeling of sitting. Also, if the cushion of the vehicle seat is flattened and thus the elastic performance of the seat is reduced, the intensity of the vibration felt by the seated person, the vibration feeling position, or the like may significantly vary.

For these reasons, there has been also proposed installation of vibrators inside a cushion rather than between the cushion and surface or in other positions. However, if vibrators are installed inside a cushion, the vibrations of the vibrators may be absorbed by the cushion, resulting in a reduction in the vibration transmit efficiency. In particular, when the vibrators give vibrations to the seated person in the up-down direction of the seating portion, the seated person may have difficulty in feeling the vibrations of the vibrators due to the vertical movement of the vehicle associated with the travel thereof.

On the other hand, there have been proposed vibration generation devices that include a vibration transmission member disposed inside the seating portion of a vehicle seat so as to extend horizontally and give a notification or alarm to the seated person by transferring a vibration horizontally through the vibration transmission member (for example, see Patent Literature 3). Since these vibration generation devices horizontally transmit a vibration to the vibration transmission member, they are able to effectively vibrate the seating portion even if the seating portion moves vertically due to the travel or the like of the vehicle.

Also, by changing or adjusting the frequency of vibrations to be transmitted by the vibration transmission member, these vibration generation devices are able to resonate the seating portion. By vibrating the vibration transmission member using the resonant frequency, which allows for the resonance of the seating portion, significant vibrations can be generated, thereby allowing the seated person recognize vibrations more easily.

CITATION LIST

Patent Literature

PTL 1: Japanese Unexamined Patent Application Publication No. 2011-048566

PTL 2: Japanese Unexamined Patent Application Publication No. 2005-280436

PTL 3: Japanese Unexamined Patent Application Publication No. 2017-019386

SUMMARY OF THE INVENTION

Technical Problem

Where multiple vibrators are disposed between the cushion and surface of the seating portion or in other positions, as seen in Patent Literatures 1 and 2, the vibration position of the seating portion can be changed by changing the vibration timing of each vibrator. By changing the vibration position, a vibration movement feeling can be given to the seated person.

On the other hand, where the vibration transmission member is disposed inside the seating portion so as to extend horizontally and vibrations are transmitted horizontally through the vibration transmission member, as seen in Patent Literature 3, the entire vibration transmission member vibrates and therefore it is not easy to adjust the vibration position on the upper surface of the seating portion. For this reason, it is difficult to give a vibration movement feeling to the seated person by changing the vibration position of the seat.

The present invention has been made in view of the foregoing, and an object thereof is to provide a vibration generation device and vibration generation method that are able to vibrate a desired position on a seat by causing a vibration generator to generate a vibration having a frequency corresponding to the frequency of an inputted signal and causing a vibration transmission member installed inside a seat and capable of transmitting a vibration in the extending direction thereof to transmit the vibration.

Another object of the present invention is to provide a vibration generation device and vibration generation method that are able to change the vibration position on a seat by vibrating a desired position on the seat and thus to give a vibration movement feeling to a seated person.

Solution to Problem

A vibration generation device according to one aspect of the present invention includes a vibration generator configured to generate a vibration having a frequency corresponding to a frequency of an inputted signal, a vibration transmission member installed inside a seat and configured to transmit a vibration in an extending direction thereof, a frequency information recorder configured to record frequency values of measurement signals such that the frequency values are associated with measurement positions of vibrations on the seat originally generated by the vibration generator on the basis of the measurement signals and transmitted to the seat by the vibration transmission member, and an output signal generator configured to obtain a frequency value of a measurement position corresponding to a desired position on the seat from the frequency information recorder and to generate an output signal having the frequency value. The vibration generator generates a vibration on the basis of the output signal and transmits a generated vibration to the vibration transmission member so that the desired position on the seat vibrates.

A vibration generation method according to another aspect of the present invention is a vibration generation method performed by a vibration generation device in which a vibration generator configured to generate a vibration having a frequency corresponding to a frequency of an inputted signal generates a vibration and transmits a generated vibration to a vibration transmission member installed inside a seat and configured to transmit a vibration in an extending direction thereof so that a desired position on the seat vibrates. The vibration generation method includes a frequency information obtaining step of an output signal generator obtaining, from a frequency information recorder configured to record frequency values of measurement signals such that the frequency values are associated with measurement positions of vibrations on the seat originally generated by the vibration generator on the basis of the measurement signals and transmitted to the seat by the vibration transmission member, a frequency value of a measurement position corresponding to the desired position on the seat, an output signal generation step of generating, by the output signal generator, an output signal having the frequency value obtained in the frequency information obtaining step, and a vibration generation step of by the vibration generator, generating a vibration on the basis of the output signal and transmitting a generated vibration to the vibration transmission member so that the desired position on the seat vibrates.

In the above vibration generation device and vibration generation method, the vibration generator configured to generate a vibration having a frequency corresponding to the frequency of an inputted signal generates a vibration and transmits a generated vibration to the vibration transmission member installed inside the seat and configured to transmit a vibration in the extending direction thereof so that the seat vibrates. For the above vibration generation device and vibration generation method thus configured, it is not easy to vibrate only a desired position, unlike a conventional vibration generation device or vibration generation method that includes multiple vibration generation members or the like installed in a seat and vibrates only a vibration generation member or the like installed in a desired position of the seat.

The above vibration generation device and vibration generation method vibrate the seat by causing the vibration transmission member to transmit a vibration generated by the vibration generator on the basis of a measurement signal. The vibration generation device and vibration generation method also record the frequency values of measurement signals used to generate vibrations in the frequency information recorder such that the frequency values are associated with the measurement positions of the seat in which the vibrations have been measured. When vibrating the seat, the vibration generation device and vibration generation method obtain the frequency value of a measurement position corresponding to a desired position from the frequency information recorder, generate an output signal having the obtained frequency value, and causes the vibration generator to generate a vibration.

As described above, by obtaining the frequency value of a measurement position corresponding to a desired position from the frequency information recorder, an output signal having the obtained frequency value is generated, and it is caused the vibration generator to generate a vibration. Thus, even the structure in which the vibration transmission member extends inside the seat is able to vibrate a desired position on the seat. Also, when vibrating the seat, the frequency value of a measurement signal whose vibration has exhibited the highest vibration level may be recorded in the frequency information recorder so as to be associated with the measurement position on the seat in which the vibration has been measured.

A vibration generation device according to yet another aspect of the present invention includes a vibration generator configured to generate a vibration having a frequency corresponding to a frequency of an inputted signal, a vibration transmission member installed inside a seat and configured to transmit a vibration in an extending direction thereof, a frequency information recorder configured to record frequency ranges that allow measurement signals to generate vibrations exhibiting a predetermined vibration level or more on the seat, such that the frequency ranges are associated with measurement positions of the vibrations on the seat exhibiting the predetermined vibration level or more originally generated by the vibration generator on the basis of the measurement signals and transmitted to the seat by the vibration transmission member, and an output signal generator configured to obtain a frequency range of a measurement position corresponding to a desired position on the seat from the frequency information recorder and to generate an output signal having any frequency in the frequency range. The vibration generator generates a vibration on the basis of the output signal and transmits a generated vibration to the vibration transmission member so that the desired position on the seat vibrates.

A vibration generation method according to still another aspect of the present invention is a vibration generation method performed by a vibration generation device in which a vibration generator configured to generate a vibration having a frequency corresponding to a frequency of an inputted signal generates a vibration and transmits a generated vibration to a vibration transmission member installed inside a seat and configured to transmit a vibration in an extending direction thereof so that a desired position on the seat vibrates. The vibration generation method includes a frequency information obtaining step of an output signal generator obtaining, from a frequency information recorder configured to record frequency ranges that allow measurement signals to generate vibrations exhibiting a predetermined vibration level or more on the seat, such that the frequency ranges are associated with measurement positions of the vibrations on the seat exhibiting the predetermined vibration level or more originally generated by the vibration generator on the basis of the measurement signals and transmitted to the seat by the vibration transmission member, a frequency range of a measurement position corresponding to the desired position on the seat, an output signal generation step of generating, by the output signal generator, an output signal having any frequency in the frequency range obtained in the frequency information obtaining step, and a vibration generation step of by the vibration generator, generating a vibration on the basis of the output signal and transmitting a generated vibration to the vibration transmission member so that the desired position on the seat vibrates.

The above vibration generation device and vibration generation method obtain the frequency range of the measurement position corresponding to the desired position on the seat from the frequency information recorder, generate an output signal having any frequency in the obtained frequency range, and cause the vibration generator to generate a vibration. Thus, even the structure in which the vibration transmission member extends inside the seat, such as the above vibration generation device and vibration generation method, is able to vibrate a desired position on the seat.

In the above vibration generation device, the output signal generator may obtain a frequency value of a measurement position corresponding to one desired position as a first frequency value from the frequency information recorder and generate a first output signal having the first frequency value, as well as may obtain a frequency value of a measurement position corresponding to another desired position as a second frequency value from the frequency information recorder and generate a second output signal having the second frequency value, and the vibration generator may change a vibration position on the seat from the one desired position to the another desired position by transmitting a vibration generated on the basis of the first output signal to the vibration transmission member and then transmitting a vibration generated on the basis of the second output signal to the vibration transmission member.

In the above vibration generation device, the output signal generator may obtain a frequency range of a measurement position corresponding to one desired position as a first frequency range from the frequency information recorder and generate a first output signal having any frequency in the first frequency range, as well as may obtain a frequency range of a measurement position corresponding to another desired position as a second frequency range from the frequency information recorder and generate a second output signal having any frequency in the second frequency range, and the vibration generator may change a vibration position on the seat from the one desired position to the another desired position by transmitting a vibration generated on he basis of the first output signal to the vibration transmission member and then transmitting vibration generated on the basis of the second output signal to the vibration transmission member.

In the above vibration generation method, the output signal generation step may include the output signal generator obtaining frequency value of a measurement position corresponding to one desired position as a first frequency value from the frequency information recorder and generating a first output signal having the first frequency value, as well as obtaining a frequency value of a measurement position corresponding to another desired position as a second frequency value from the frequency information recorder and generating a second output signal having the second frequency value, and the vibration generation step may include the vibration generator changing a vibration position on the seat from the one desired position to the another desired position by transmitting a vibration generated on the basis of the first output signal to the vibration transmission member and then transmitting a vibration generated on the basis of the second output signal to the vibration transmission member.

In the above vibration generation method, the output signal generation step may include the output signal generator obtaining a frequency range of a measurement position corresponding to one desired position as a first frequency range from the frequency information recorder and generating a first output signal having any frequency in the first frequency range, as well as obtaining a frequency range of a measurement position corresponding to another desired position as a second frequency range from the frequency information recorder and generating a second output signal having any frequency in the second frequency range, and the vibration generation step may include the vibration generator changing a vibration position on the seat from the one desired position to the another desired position by transmitting a vibration generated on the basis of the first output signal to the vibration transmission member and then transmitting a vibration generated on the basis of the second output signal to the vibration transmission member.

The above vibration generation device and vibration generation method are able to change the vibration position on the seat from the one desired position to the another desired position and thus to give a vibration movement feeling to the seated person.

In the above vibration generation device and vibration generation method, the predetermined vibration level may be a minimum vibration level that allows a seated person on the seat to feel the vibration.

In the above vibration generation device and vibration generation method, the predetermined vibration level is a minimum vibration level that allows a seated person on the seat to feel the vibration. For this reason, when an output signal is generated on the basis of a frequency value or any frequency in a frequency range recorded in the frequency information recorder and the seat is vibrated on the basis of the generated output signal, the seated person is able to surely feel the vibration. As a result, when giving an alarm or the like to the seated person using a vibration of the seat, the seated person is able to surely become aware of whether an alarm or the like has been given, on the basis of the vibration felt by the seated person.

The above vibration generation device may further include a vibration time information recorder configured to record a time during which a seated person continues to feel a vibration on the seat caused by an impulse response generated by using an impulse input signal as a measurement signal, as a vibration time such that the vibration time is associated with a measurement position on the seat in which the vibration has been measured. The output signal generator may obtain a vibration time of a measurement position corresponding to the desired position on the seat from the vibration time information recorder and generate an output signal whose signal level is not limited from start of output of the signal until a lapse of a time obtained by subtracting the vibration time from a predetermined time and is limited to zero from immediately after a lapse of the time until a lapse of the vibration time.

The above vibration generation method may further include a vibration time information obtaining step of the output signal generator obtaining, from a vibration time information recorder configured to record a time during which a seated person continues to feel a vibration on the seat caused by an impulse response generated by using an impulse input signal as a measurement signal, as a vibration time such that the vibration time is associated with a measurement position on the seat in which the vibration has been measured, a vibration time of a measurement position corresponding to the desired position on the seat. The output signal generation step may include generating, by the output signal generator, an output signal whose signal level is not limited from start of output of the signal until a lapse of a time obtained by subtracting the vibration time obtained in the vibration time information obtaining step from a predetermined time and is limited to zero from immediately after a lapse of the time until a lapse of the vibration time.

The above vibration generation device and vibration generation method vibrate the seat by transmitting a vibration generated by the vibration generator to the vibration transmission member extending inside the seat. In the case of the seat thus configured, the time during which the seated person continues to feel a vibration on the seat is not constant due to the differences in vibration characteristics among the positions of the seat.

For this reason, the vibration generation device and vibration generation method first generate a vibration on the seat due to an impulse response generated by using an impulse input signal as a measurement signal. Also, the vibration time during which the seated person has continued to feel a vibration on the seat is recorded in the vibration time information recorder so as to be associated with the measurement position on the seat in which the vibration has been measured. Then, the output signal generator obtains the vibration time of the measurement position corresponding to the desired position from the vibration time information recorder. The output signal generator then generates the output signal whose signal level is not limited from the start of output of the signal to a lapse of the time obtained by subtracting the vibration time from the predetermined time and is limited to zero from immediately after a lapse of the time until a lapse of the vibration time.

Due to the differences in vibration characteristics among the respective positions of the seat, the time during which the seated person continues to feel a vibration on the seat may not be constant, that is, the vibration feeling time may vary among the respective portions on the seat. However, by limiting the signal level of the output signal to zero from immediately after a lapse of the time obtained by subtracting the vibration time from the predetermined time until a lapse of the vibration time, the seated person is able to feel the vibration for the predetermined time regardless of the differences in vibration characteristics among the positions of the seat, or the vibration position.

Advantageous Effects of Invention

The vibration generation device and vibration generation method according to an embodiment of the present invention vibrate the seat by causing the vibration transmission member to transmit a vibration generated by the vibration generator on the basis of a measurement signal. The vibration generation device and vibration generation method also record the frequency values of measurement signals used to generate vibrations in the frequency information recorder such that the frequency values are associated with the measurement positions of the seat in which the vibrations have been measured. When vibrating the seat, the vibration generation device and vibration generation method obtain the frequency value of a measurement position corresponding to a desired position from the frequency information recorder, generate an output signal having the obtained frequency value, and causes the vibration generator to generate a vibration.

As described above, by obtaining the frequency value of a measurement position corresponding to a desired position from the frequency information recorder, an output signal having the obtained frequency value is generated, and it is caused the vibration generator to generate a vibration. Thus, even the structure in which the vibration transmission member extends inside the seat is able to vibrate a desired position on the seat.

DESCRIPTION OF EMBODIMENTS

Figure 1:
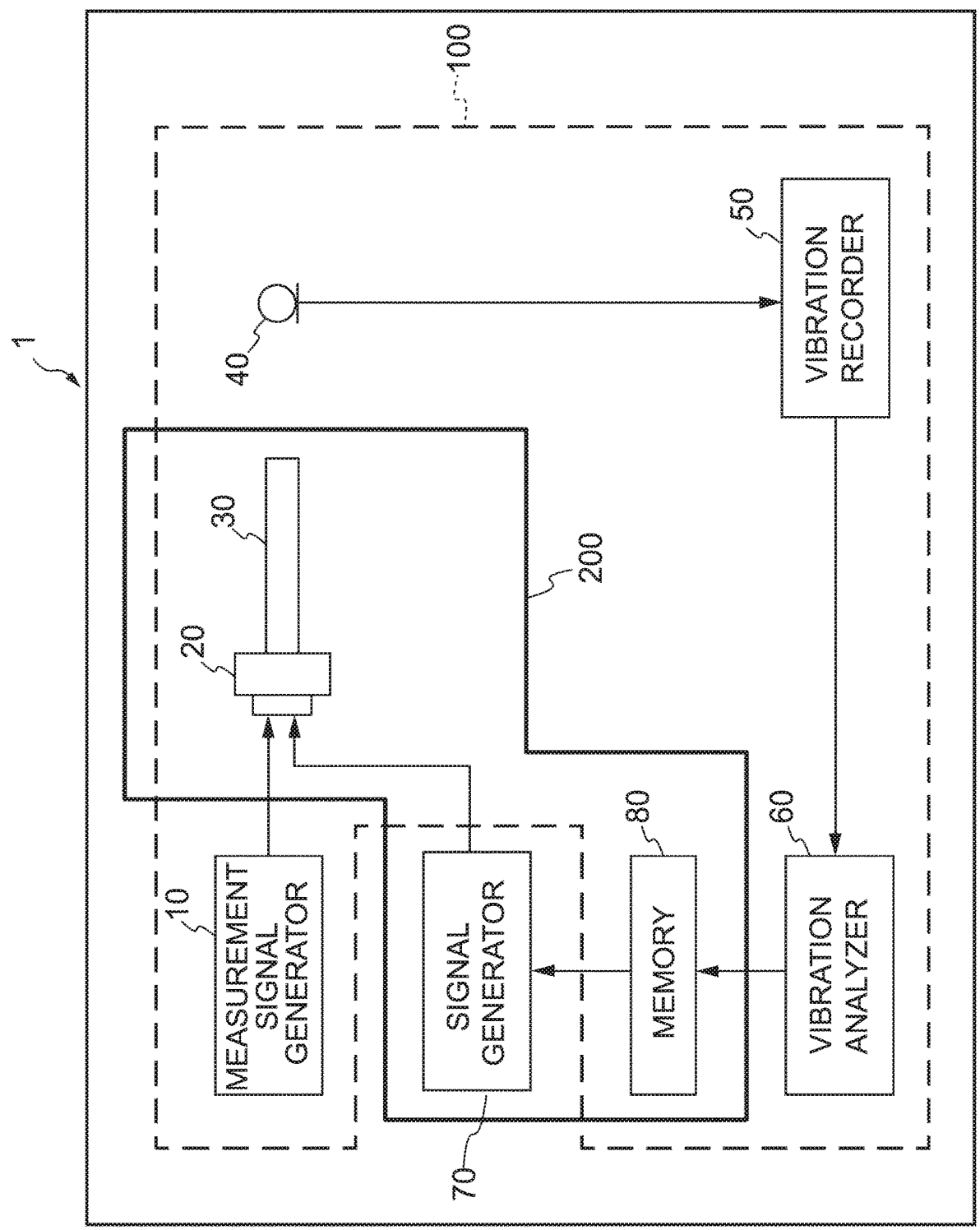
FIG. 1 is a block diagram showing a schematic configuration of a vehicle notification system according to an embodiment.

Now, an example of a vibration generation device according to the present invention will be described with reference to the drawings. FIG. 1 is a block diagram showing a vehicle notification system including a vibration generation device. As shown in FIG. 1, a vehicle notification system 1 includes a measurement signal generator 10, an exciter (vibration generator) 20, a vibration transmission member 30, pickups 40, a vibration recorder 50, a vibration analyzer 60, a signal generator (output signal generator) 70, and a memory (frequency information recorder, vibration time information recorder) 80.

Of the components of the vehicle notification system 1, the measurement signal generator 10, exciter 20, vibration transmission member 30, multiple pickups 40, vibration recorder 50, vibration analyzer 60, and memory 80 form a vibration analysis device 100, and the signal generator 70, memory 80 exciter 20, and vibration transmission member 30 form a vibration generation device 200. The vibration analysis device 100 and vibration generation device 200 are mounted on a vehicle.

Figure 2A:
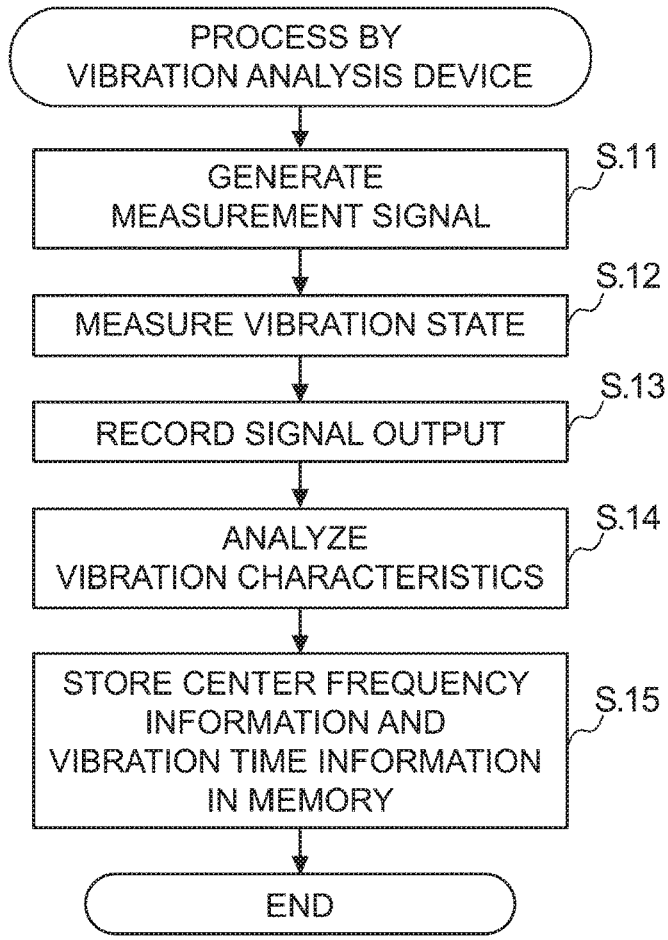
FIG. 2(a) is a flowchart showing details of a process performed by a vibration analysis device according to the embodiment.

The vibration analysis device 100 detects the vibration states of the installation positions of the pickups 40 on the vehicle seat. FIG. 2(a) is a flowchart showing details of a vibration analysis process performed by the vibration analysis device 100. The vibration analysis process performed by the vibration analysis device 100 will be described below with reference to the flowchart shown in FIG. 2(a).

[Measurement Signal Generator]

The measurement signal generator 10 generates a measurement signal for vibrating the vehicle seat (S.11). In the present embodiment, a sound-field measurement signal, such as a time-stretched pulse (TSP) signal, is used as an example of a measurement signal. A maximum length sequence code may be used as a measurement signal. A TSP signal is a pulse signal having a phase that is proportional to the square of the frequency and is equivalent to a short-time sweep signal. A maximum length sequence code is a pseudorandom signal that is similar to white noise. A TSP signal or maximum length sequence code is typically used as a measurement signal (impulse input signal) for measuring an impulse response in an acoustic environment. By using a TSP signal or maximum length sequence code as a measurement signal, the signal level corresponding to a wide frequency range can be measured. The measurement signal generator 10 outputs a generated measurement signal to the exciter 20.

[Exciter]

The exciter 20 generates a vibration having a frequency corresponding to the frequency of the measurement signal received from the measurement signal generator 10. Typically, an exciter is mounted on a flat panel or the like and outputs a sound or vibration by giving a vibration to the flat panel or the like. For this reason, the structure of an exciter differs from a typical speaker, which combines a speech signal (vibration) with ambient air using a frame and a conical diaphragm. An exciter is configured to transmit a vibration transmitted from a voice coil to the surface of a flat panel or the like on which the exciter is mounted, using an inertial force generated by acting on the mass (weight) of the exciter itself. A detailed structure or the like of an exciter is an already widely known technology (for example, see Japanese Unexamined Patent Application Publication No. 2017-019386) and therefore will not be described in detail in the present embodiment.

In the present embodiment, the exciter 20 will be described as an example of a device that generates a vibration having a frequency corresponding to the frequency of an inputted signal. However, such a vibration generation device is not limited to the exciter 20. Any type of vibrator other than the exciter 20 may be used as long as the vibrator is a device capable of generating a vibration having a frequency corresponding to the frequency of an inputted signal.

[Vibration Transmission Member]

Figure 3:
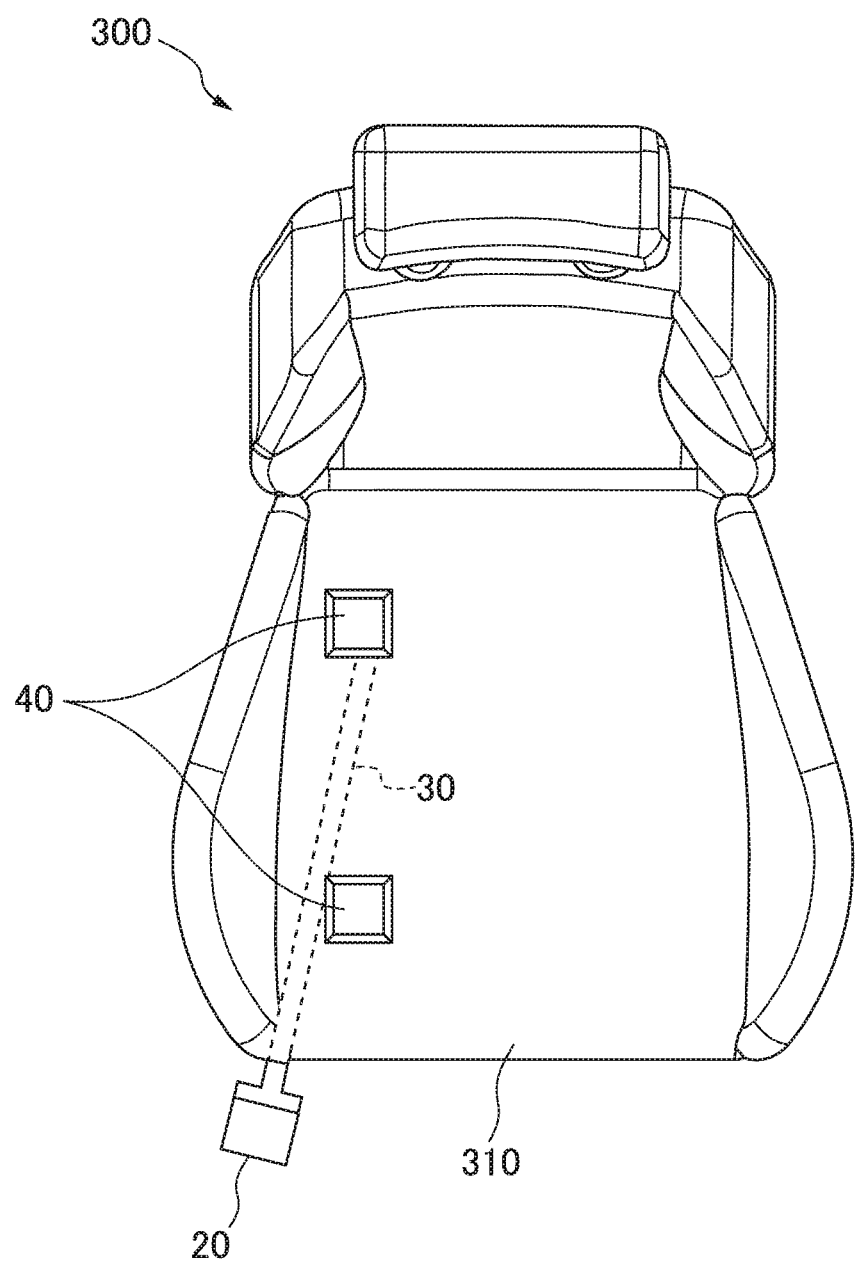
FIG. 3 is a schematic drawing showing a state in which an exciter, and a vibration transmission member are installed in a vehicle seat, and pickups are installed on the vehicle seat.

The vibration transmission member 30 is a rod-shaped member having a circular cross-section and is formed of a metal or the like that easily transfers a vibration. As shown in FIG. 3, the vibration transmission member 30 is embedded in the seating portion 310 of a vehicle seat 300 so as to extend approximately horizontally in the front-rear direction of the seating portion 310. Specifically, the vibration transmission member 30 is embedded in the seating portion 310 in an extending manner by performing insert molding such that the cushion of the seating portion 310 is molded with the vibration transmission member 30 inserted. Alternatively, the vibration transmission member 30 is embedded as follows: a cushion is molded, then an insertion hole for inserting the vibration transmission member 30 is formed in the cushion, and the vibration transmission member 30 is inserted and then fixed to the cushion using an adhesive or the like.

The exciter 20 is mounted on the cross-section of an end of the vibration transmission member 30 (in FIG. 3, the cross-section of the front end of the seating portion 310). When the exciter 20 generates a vibration on the basis of a measurement signal, the vibration is transmitted by the vibration transmission member 30 in the extending direction of the vibration transmission member 30 (the front-rear direction of the seating portion 310) from the cross-section of the end thereof. Note that the configuration in which the exciter 20 and vibration transmission member 30 are installed in the seating portion 310 of the vehicle seat 300 is already disclosed in Japanese Unexamined Patent Application Publication No. 2017-019386 and the like and therefore will not be described in detail.

In the present embodiment, a rod-shaped member having a circular cross-section and formed of a metal or the like that easily transfers a vibration is used as an example of the vibration transmission member 30. However, the shape, material, or the like of the vibration transmission member 30 is not limited to a particular shape or the like as long as it has a body having an extending shape and is able to transmit a vibration in the extending direction thereof. Any type of member may be used as a vibration transmission member as long as it is able to transmit a vibration in the extending direction thereof.

In FIG. 3, the exciter 20 and vibration transmission member 30 are shown only in left positions of the seating portion 310 seen from the front. However, the exciter 20 and vibration transmission member 30 need not be installed in the left positions of the seating portion 310 and may be installed in other positions, such as right positions, of the seating portion 310 seen from the front. Hereafter, assuming that the exciter 20 and vibration transmission member 30 are installed in the left positions of the seating portion 310 seen from the front, the vehicle notification system 1 according to the present embodiment will be described. The "left side of the seating portion 310 seen from the front" is referred to as "the left side of the seating portion 310."

[Pickups]

The pickups 40 are measurement devices that measure a vibration as a signal (signal output). The pickups 40 are installed on predetermined positions of the seating portion 310. The pickups 40 measure the vibration states of the respective positions of the seating portion 310 (S.12).

For example, as shown in FIG. 3, one pickup 40 is installed on each of a front-left position and a rear-left position of the seating portion 310. Thus, the vibration states of the front-left position and rear-left position of the seating portion 310 can be measured so as to be associated with the vibration measurement positions. While the pickups 40 are installed only on the front-left position and rear-left position on the seating portion 310 in FIG. 3, the installation positions, number, or the like of the pickups 40 are not limited to particular positions or the like. Three, four, or more pickups 40 may be installed on the seating portion 310.

The vibrations detected by respective pickups 40 are outputted to the vibration recorder 50 as information (signals) associated with the installation positions of the pickups 40, that is, the vibration measurement positions.

[Vibration Recorder]

The vibration recorder 50 records the signal output detected by the pickups 40 in a time-series manner (S.13). Where multiple pickups 40 are installed as shown in FIG. 3, the vibration recorder 50 individually records the signal output detected by the pickups 40. By recording the signal output measured by the pickups 40 in the vibration recorder 50, vibration characteristics of the respective positions of the seating portion 310 can be recorded as vibration measurement data. This vibration characteristics measurement is performed using an acoustic characteristics principle in which the sound field is measured using a microphone.

[Frequency Analyzer]

The vibration analyzer 60 analyzes the vibration characteristics of the seating portion 310 on the basis of the vibration measurement data (signal output) of the respective positions of the seating portion 310 recorded in the vibration recorder 50 (S.14). The vibration analyzer 60 first obtains impulse responses, which are typically used in sound-field analysis, on the basis of the vibration measurement data of the installation positions of the pickups 40 recorded in the vibration recorder 50. The vibration analyzer 60 then frequency-analyzes the obtained impulse responses to obtain spectrograms that allow for determination of frequency characteristics corresponding to the elapsed time (time axis) of each signal output. By using these spectrograms, the vibration characteristics can be represented by three-dimensional graphs consisting of the time, the frequency, and the intensity of the frequency signal component. By using the three-dimensional graphs based on the spectrograms, the vibration response or the resonant frequency band of the seating portion 310 can be determined.

Figure 4A:
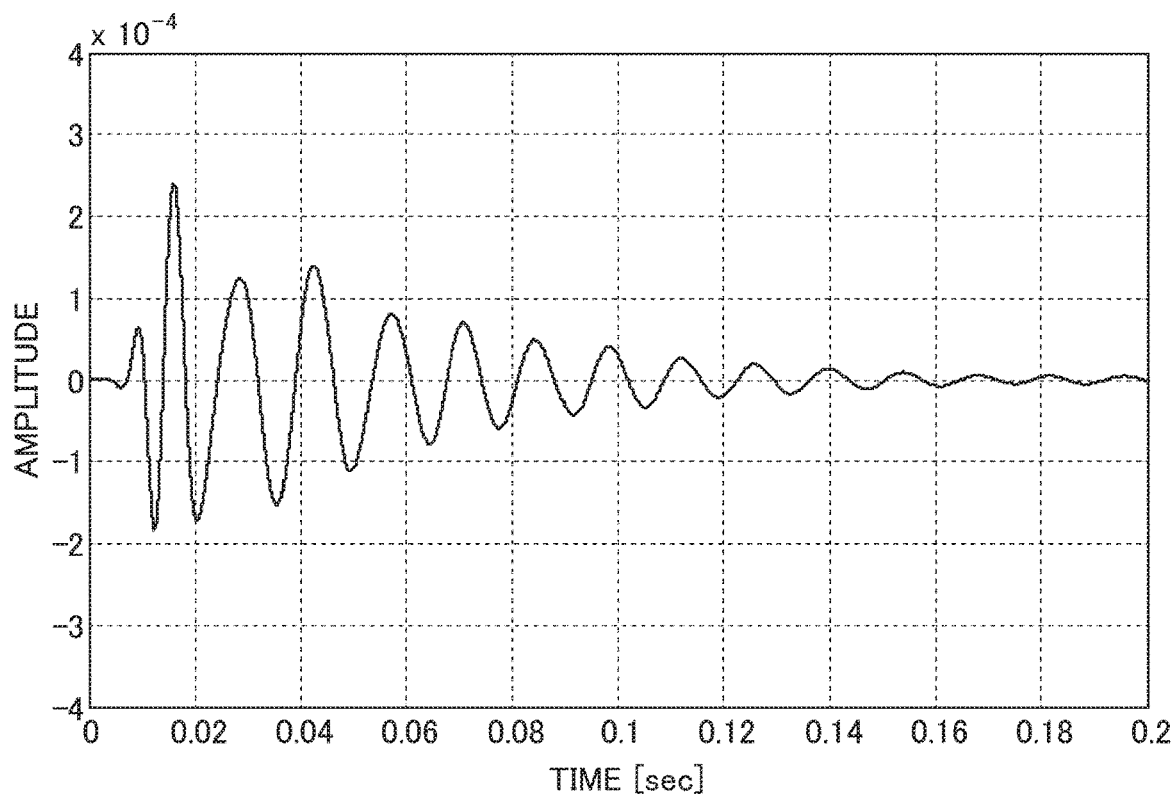
FIG. 4(a) is a graph showing an impulse response of a measurement signal detected by a pickup installed on a front-left position of a seating portion according to the embodiment.
Figure 4B:
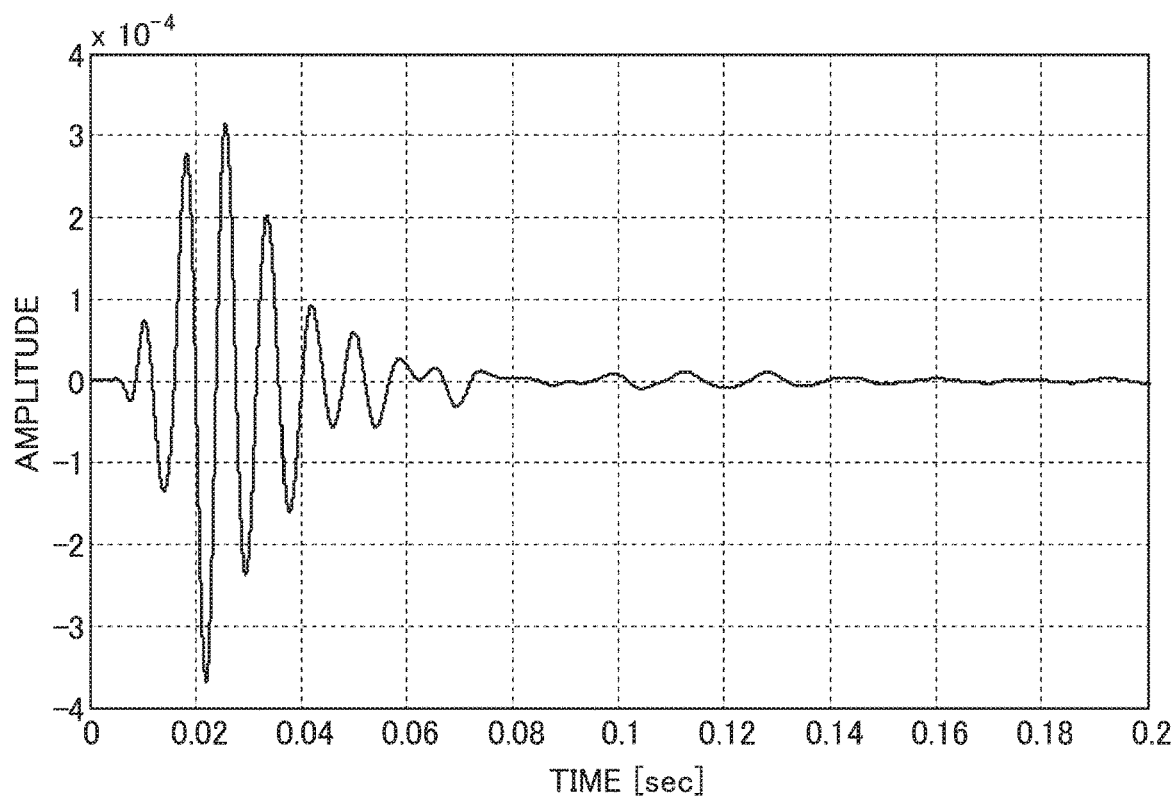
FIG. 4(b) is a graph showing an impulse response of a measurement signal detected by a pickup installed on a rear-left position thereof.
Figure 5:
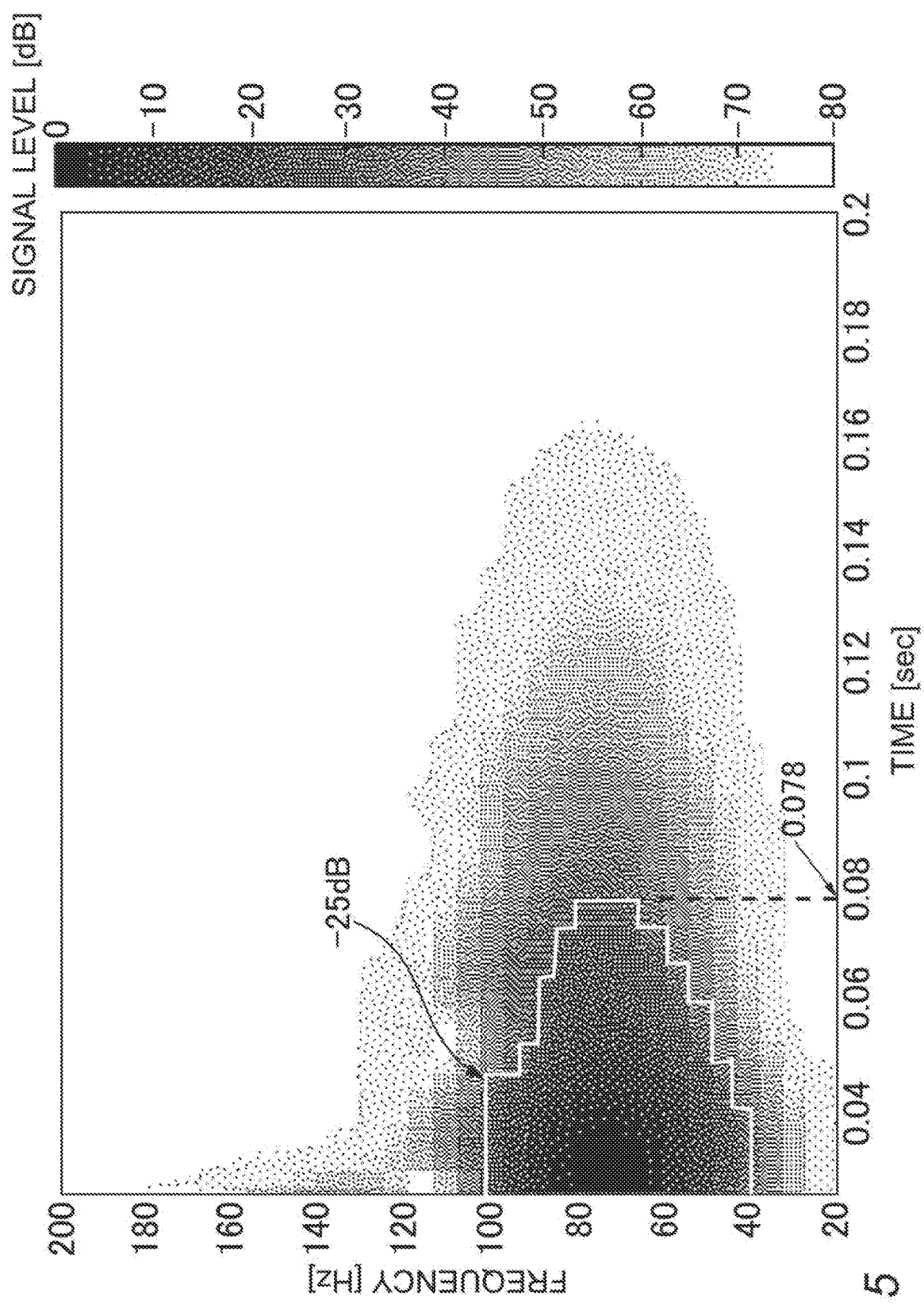
FIG. 5 is a graph showing a spectrogram of the impulse response shown in FIG. 4(a)
Figure 6:
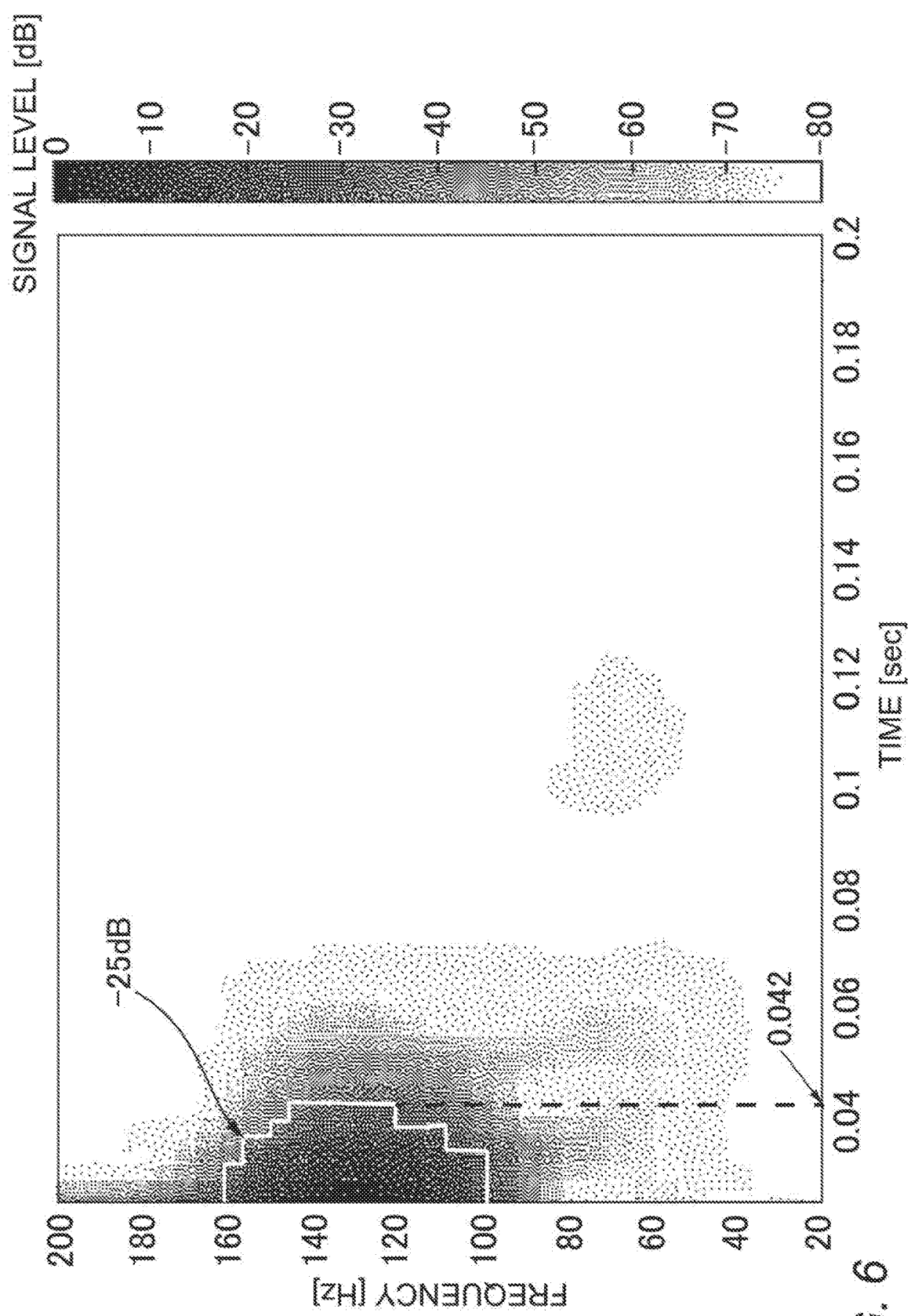
FIG. 6 is a graph showing a spectrogram of the impulse response shown in FIG. 4(b)

In the present embodiment, assuming that the pickups 40 are installed on the front-left and rear-left positions of the seating portion 310 as shown in FIG. 3, spectrograms are obtained from the impulse responses detected by the pickups 40. FIG. 4(*a*) is a graph showing an impulse response detected by a pickup 40 installed on the front-left position of the seating portion 310, and FIG. 5 is a graph showing a spectrogram thereof. FIG. 4(*b*) is a graph showing an impulse response detected by a pickup 40 on the rear-left position of the seating portion 310, and FIG. 6 is a graph showing a spectrogram thereof. As is evident in the spectrogram shown in FIG. 5, the vibration characteristics detected on the front-left position of the seating portion 310 show that a vibration having the highest signal level (power) is generated with respect to a measurement signal having a center frequency of about 70 Hz.

Figure 7:
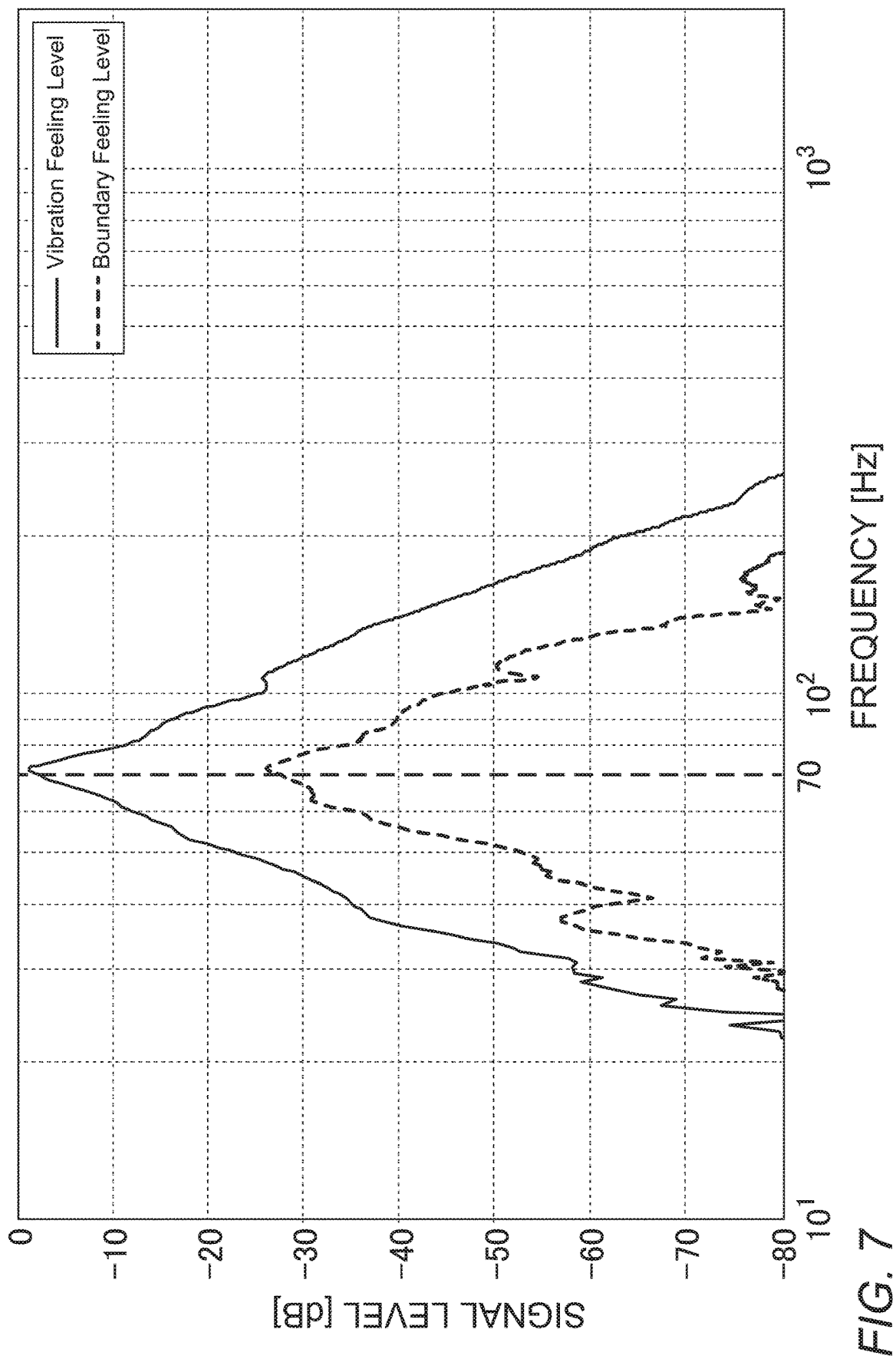
FIG. 7 is a graph showing a signal level that allows a seated person to sufficiently feel a vibration from the vibration position during travel of the vehicle and the minimum signal level that allows the seated person to feel a vibration from the vibration position during travel of the vehicle.

Here, there is determined what signal level allows a person seated on the seating portion 310 (seated person) to feel a vibration. FIG. 7 is a graph showing a signal level that allows the seated person to sufficiently feel a vibration (vibration feeling level) from the vibration position during travel of the vehicle and the minimum signal level that allows the seated person to feel a vibration (boundary feeling level) from the vibration position during travel of the vehicle. FIG. 7 shows a case in which the signal level of a measurement signal having a center frequency of 70 Hz is changed on the vibration position of the seating portion 310 on which the peak of the vibration signal level (vibration) is 70 Hz. In FIG. 7, assuming that the vibration signal level that allows the seated person to sufficiently feel a vibration (vibration feeling level) is 0 dB, the signal level is gradually reduced, and there is obtained a signal level immediately before the seated person becomes unable to feel the vibration, that is, the minimum signal level that allows the seated person to feel the vibration (boundary feeling level). In FIG. 7, a signal level of −25 dB is detected as the boundary feeling level. That is, the seated person is able to feel a vibration from the vibration transmission member 30 even during travel of the vehicle as long as the difference between the boundary feeling level and the vibration feeling level (0 dB), which the seated person is able to sufficiently feel, is within 25 dB.

The vibration analyzer 60 detects frequency components corresponding to a signal level of −25 dB or more in the spectrogram shown in FIG. 5. In the spectrogram shown in FIG. 5, the signal level is −25 dB or more in a frequency range of 40 Hz to 100 Hz. For this reason, by outputting, as a vibration, a signal having any frequency component of 40 Hz to 100 Hz from the exciter 20, the seated person can surely feel a vibration on the front-left position of the seating portion 310.

The frequency range corresponding to signal levels of −25 dB or more is changed in accordance with the type, internal structure, material, or the like of the vehicle seat. For example, if the signal level of a measurement signal having a center frequency of 70 Hz is changed in a seat other than the vehicle seat 300, the frequency range corresponding to a boundary feeling level of −25 dB or more is not necessarily a frequency range of 40 Hz to 100 Hz.

The vibration analyzer 60 also detects elapsed times (sec) corresponding to signal levels of −25 dB or more in the spectrogram shorn in FIG. 5. The spectrogram shown in FIG. 5 shows that the signal level is −25 dB or more until a lapse of about 0.078 sec after the start of output of an impulse input signal of 70 Hz and becomes −25 dB or lower after a lapse of about 0.078 sec. Accordingly, the seated person can be caused to continue to feel the vibration on the front-left position of the seating portion 310 for a time length of about 0.078 sec after the stop of output of the signal (impulse input signal) including a frequency component 70 Hz.

Similarly, as is evident in the spectrogram shown in FIG. 6, the vibration characteristics detected on the rear-left position of the seating portion 310 show that when a measurement signal having a center frequency of about 130 Hz is outputted, a vibration having the highest signal level (power) is generated. The vibration analyzer 60 detects frequency components corresponding to signal levels of −25 dB or more in the spectrogram shown in FIG. 6. In the spectrogram shown in FIG. 6, the signal level is −25 dB or more in a frequency range of about 100 Hz to 160 Hz. Accordingly, by outputting, as a vibration, a signal having any frequency component of 100 Hz to 160 Hz from the exciter 20, the seated person can surely feel a vibration on the rear-left position of the seating portion 310.

If the signal level of a measurement signal having a center frequency of 130 Hz is changed, the frequency range corresponding to a boundary feeling level of −25 dB or more is not necessarily a frequency range of 100 Hz to 160 Hz. As described above, the frequency range corresponding to signal levels of −25 dB or more is changed in accordance with the type, internal structure, material, or the like of the vehicle seat.

The vibration analyzer 60 also detects elapsed times (sec) corresponding to signal levels of −25 dB or more in the spectrogram shown in FIG. 6. In the spectrogram shown in FIG. 6, the signal level is −25 dB or snore until a lapse of about 0.042 sec after the start of output of an impulse input signal of 130 Hz and becomes −25 dB or lower after a lapse of about 0.042 sec. Accordingly, the seated person can be caused to continue to feel the vibration on the rear-left position of the seating portion 310 for a time length of about 0.042 sec after the stop of output of the signal (impulse input signal) including a frequency component of 130 Hz.

As seen above, by outputting a signal having a predetermined frequency component from the exciter 20, the seated person can be caused to feel a vibration from the seating portion 310. For example, where a signal having any frequency component of 40 Hz to 100 Hz is outputted as a vibration, as shown in FIG. 5, the seated person can he caused to feel the vibration by setting a predetermined frequency, such as 50 Hz, 70 Hz, or 90 Hz, as the frequency of the output signal.

Hereafter, information about a frequency corresponding to a peak of a detected vibration signal level (vibration level) is referred to as "center frequency information." Also, information about an elapsed time during which the seated person can be caused to continue to feel the vibration after the stop of output of a signal having a center frequency is referred to as "vibration time information." In the above example, 70 Hz corresponds to the center frequency information of the front-left position of the seating portion 310, and 0.078 sec corresponds to the vibration time information thereof. Also, 130 Hz corresponds to the center frequency information of the rear-left position of the seating portion 310, and 0.042 sec corresponds to the vibration time information thereof.

The "center frequency information" and "vibration time information" detected by the vibration analyzer 60 are stored in the memory 80 (S.15). As will be described later, if a sweep signal is used as an output signal for generating a vibration, "frequency range information" indicating a frequency range in which the seated person can be caused to feel the vibration may be recorded in the memory 80. In the above example, 40 Hz to 100 Hz corresponds to the frequency range information of the front-left position of the seating portion 310, and 100 Hz to 160 Hz corresponds to the frequency range information of the rear-left position of the seating portion 310.

[Memory]

The memory 80 is typical data storage means. The memory 80 is not limited to a particular configuration or type as long as it is typical storage means capable of storing and reading data, such as a hard disk, solid state drive (SSD), or non-volatile memory. The memory 80 stores the center frequency information, vibration time information, and frequency range information of the respective positions of the seating portion 310 detected by the vibration analyzer 60. More specifically, the memory 80 stores these types of information of the installation positions (measurement positions) of the pickups 40. In a reading process, the signal generator 70 can obtain the center frequency information, vibration time information, and frequency range information stored in the memory 80.

[Frequency Analysis Device]

As described above, the vibration analysis device 100 includes the measurement signal generator 10, exciter 20, vibration transmission member 30, pickups 40, vibration recorder 50, vibration analyzer 60, and memory 80. The vibration analysis device 100 detects the center frequency information, vibration time information, and frequency range information of the respective positions of the seating portion 310. The center frequency information, vibration time information, and/or frequency range information detected by the vibration analysis device 100 vary among vehicle seats. In other words, the center frequency information, vibration time information, and frequency range information obtained by the vibration analysis device 100 are information specific to the seat characteristics of the vehicle seat in which the vibration analysis devices 100 is installed.

[Vibration Generation Device]

After the information (center frequency information, frequency range information, vibration time information) unique to the vehicle seat is obtained by the vibration analysis device 100 and stored in the memory 80, the measurement signal generator 10, pickups 40, vibration recorder 50, and vibration analyzer 60 becomes unnecessary and are detached from the vehicle seat 300, and the exciter 20, vibration transmission member 30, memory 80, and signal generator 70 form the vibration generation device 200 in the vehicle seat 300. The vibration generation device 200 is able to vibrate a desired position of the seating portion 310.

[Signal Generator]

Figure 2B:
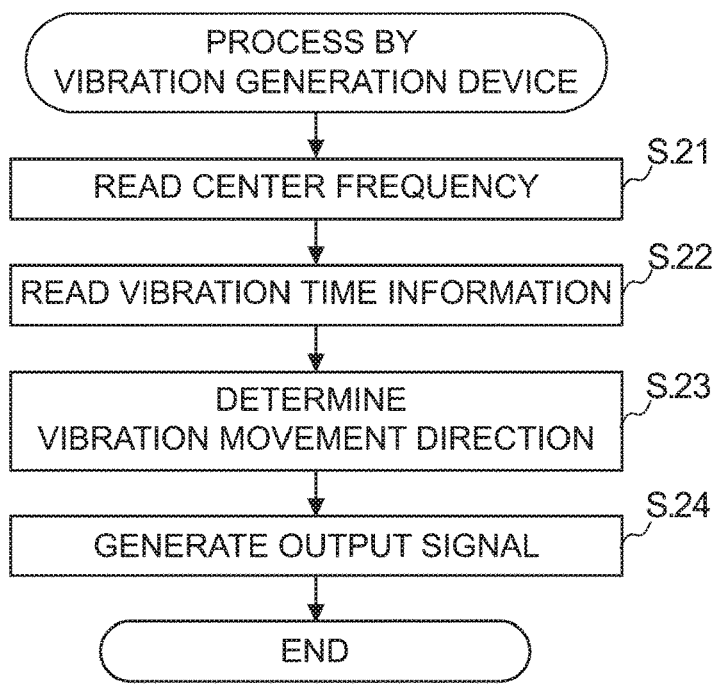
FIG. 2(b) is a flowchart showing details of a process performed by a vibration generation device according to the embodiment.

The signal generator 70 generates an output signal to be outputted from the exciter 20 as a vibration on the basis of the center frequency information and vibration time information stored in the memory 80. FIG. 2(b) is a flowchart showing details of an output signal generation process performed by the signal generator 70.

The signal generator 70 reads (obtains) the center frequency information from the memory 80 and stores it in a temporary memory, such as RAM (S.21). For example, on the basis of the seat vibration analysis result (spectrogram) shown in FIG. 5, the signal generator 70 reads 70 Hz of the front-left position and 130 Hz of the rear-left position of the seating portion 310 from the memory 80 as the center frequencies and stores them in the temporary memory. Note that the center frequency information may be stored in a different area of the memory 80 rather than in the temporary memory, such as RAM.

The signal generator 70 then reads the vibration time information from the memory 80 and stores it in the temporary memory (S.22). In the case of the seat vibration analysis result (spectrogram) shown in FIG. 5, 0.078 sec is stored in the memory 80 as the vibration time information of the front-left position (center frequency 70 Hz) of the seating portion 310. Also, in the case of the seat vibration analysis result (spectrogram) shown in FIG. 6, about 0.042 sec is stored in the memory 80 as the vibration time information of the rear-left position (center frequency 130 Hz) of the seating portion 310.

The vibration time information means that when causing the seated person to feel a vibration based on an impulse response, the seated person can be caused to continue to feel the vibration on the from the left position of the vehicle seat 300 until a lapse of 0.078 sec after the stop of output of the signal. The vibration time information also means that the seated person can be caused to continue to feel the vibration on the rear-left position of the vehicle seat 300 until a lapse of 0.042 sec after the stop of output of the signal. Accordingly, if the signals are outputted to the front-left position and rear-left position for the same time length, the seated person would feel the vibration for a longer time length on the front-left position than in the rear-left position.

Then, the signal generator 70 determines the direction in which the seated person feels a vibration on the seating portion 310, that is, the vibration movement direction (S.23). For example, when causing the seated person to feel a vibration on the seating portion 310, the signal generator 70 determines whether the vibration should be moved in a direction from the front side to the rear side, a direction from the rear side to the front side, or other directions.

The vibration movement direction may be determined by storing the movement direction determined by the seated person in the memory 80 in advance and reading it from the memory 80. Or, the vibration movement direction may be determined, for example, by causing the seated person to select or input the movement direction. The determined movement direction is stored in the temporary memory, such as RAM, as a vibration movement information.

The signal generator 70 then reads the center frequency information, vibration time information, and vibration movement direction stored in the temporary memory, such as RAM, and generates an output signal to be outputted from the exciter 20 as a vibration (S.24). In the present embodiment, it is assumed that an output signal having a time length of 1 sec is generated.

Figure 8:
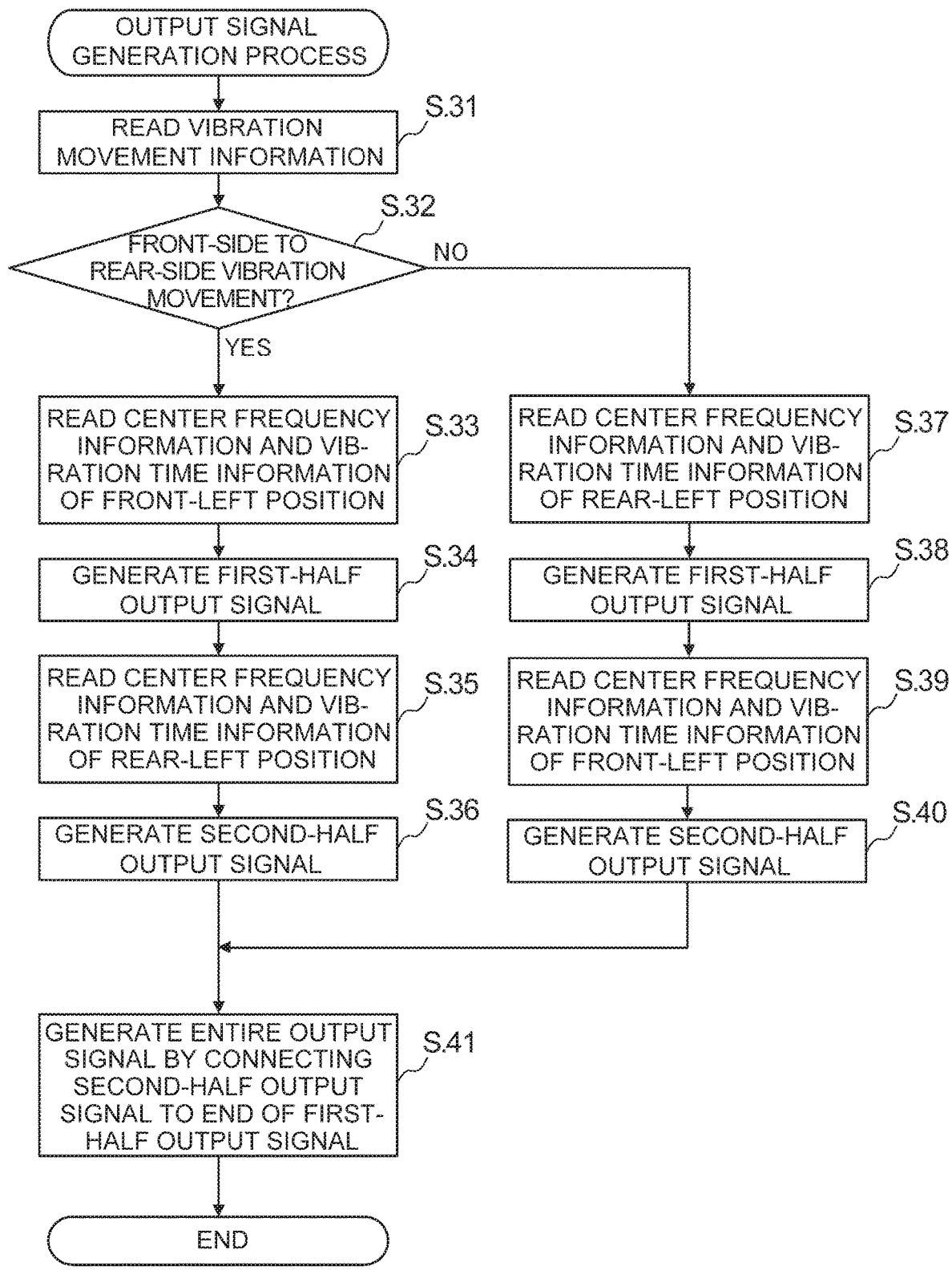
FIG. 8 is a flowchart showing details of an output signal generation process performed by a signal generator according to the embodiment.

FIG. 8 is a flowchart showing an output signal generation process performed by the signal generator 70. The signal generator 70 first reads the vibration movement information indicating the vibration movement direction from the temporary memory (S.31). The signal generator 70 then determines whether the read vibration movement information indicates the movement of the vibration from the front side to the rear side of the seating portion 310 (S.32).

If the read vibration movement information indicates the movement of the vibration from the front side to the rear side (Yes in S.32), the signal generator 70 first reads the center frequency information and vibration time information of the front-left position from the temporary memory (S.33). In the present embodiment, the signal generator 70 reads 70 Hz as the center frequency information of the front-left position and 0.078 sec as the vibration time information of the front-left position from the temporary memory. The signal generator 70 then generates an output signal for vibrating the front-left position on the seating portion 310 for a time length of 0.5 sec (first-half output signal) (S.34). In the present embodiment, the signal generator 70 generates a single-tone signal having a center frequency of 70 Hz. The first-half output signal corresponds to a first output signal according to the present invention.

As described above, when an impulse input signal having a center frequency of 70 Hz is outputted from the exciter 20, the seated person continues to feel a vibration for a time length of about 0.078 sec after the stop of output of the signal. Accordingly, to cause the seated person to feel a vibration on the front-left position of the seating portion 310 for a time length of 0.5 sec, it is necessary to maintain the signal level of a signal having a time length of 0.422 sec, which is (0.500 sec-0.078 sec), without limiting it and then to limit the signal level to zero for a time length of 0.078 sec.

For this reason, the signal generator 70 generates a signal that has a frequency of 70 Hz and whose signal level will be not limited but maintained for a time length of 0.422 sec after the start of output of the signal and then will be limited to zero (0 dB) for a time length of 0.078 sec, as an output signal having a first-half time length of 0.5 sec on the basis of the center frequency of 70 Hz and the vibration time of 0.078 sec read from the temporary memory.

The signal generator 70 then reads the center frequency information and vibration time information of the rear-left position from the temporary memory (S.35). In the present embodiment, the signal generator 70 reads 130 Hz as the center frequency information of the rear-left position and 0.042 sec as the vibration time information of the rear-left position from the temporary memory. The signal generator 70 then generates an output signal for vibrating the rear-left position on the seating portion 310 for a time length of 0.5 sec (second-half output signal) (S.36). In the present embodiment, the signal generator 70 generates a single-tone signal having a center frequency of 130 Hz. The second-half output signal corresponds to a second output signal according to the present invention.

As described above, when an impulse input signal having a center frequency of 130 Hz is outputted from the exciter 20, the seated person continues to feel a vibration for a time length of about 0.042 sec after the stop of output of the signal. Accordingly, to cause the seated person to feel a vibration on the rear-left position of the seating portion 310 for a time length of 0.5 sec, it is necessary to maintain the signal level of a signal having a time length of 0.458, which is (0.500 sec-0.042 sec), without limiting it and then to limit the signal level to zero for a time length of 0.042 sec.

For this reason, the signal generator 70 generates a signal that has a frequency of 130 Hz and whose signal level will be not limited but maintained for a time length of 0.458 sec after the start of output of the signal and then will be limited to zero (0 dB) for a time length of 0.042 sec, as an output signal having a second-half time length of 0.5 sec on the basis of the center frequency of 130 Hz and the vibration time of 0.042 sec read from the temporary memory.

On the other hand, if the vibration movement information indicates the movement of a vibration from the rear side to the front side (NO in S.32), the signal generator 70 first reads the center frequency information and vibration time information of the rear-left position from the temporary memory (S.37). In the present embodiment, the signal generator 70 reads 130 Hz as the center frequency information of the rear-left position and 0.042 sec as the vibration time information of the rear-left position from the temporary memory. The signal generator 70 then generates an output signal for vibrating the rear-left position on the seating portion 310 for a time length of 0.5 sec (first-half output signal) (S.38). In the present embodiment, the signal generator 70 generates a single-tone signal having a center frequency of 130 Hz.

The concrete generation step is the same as the step of generating an output signal for the rear-left position described in S.36. In this step, the signal generator 70 generates a signal that has a frequency of 130 Hz and whose signal level will be not limited but maintained for a time length of 0.458 sec after the start of output of the signal and then will be limited to zero (0 dB) for a time length of 0.042 sec, as an output signal having a first-half time length of 0.5 sec.

The signal generator 70 then reads the center frequency information and vibration time information of the front-left position from the temporary memory (S.39). In the present embodiment, the signal generator 70 reads 70 Hz as the center frequency information of the front-left position and 0.078 sec as the vibration time information of the front-left position from the temporary memory. The signal generator 70 then generates an output signal for vibrating the front-left position on the seating portion 310 for a time length of 0.5 sec (second-half output signal) (S.40). In the present embodiment, the signal generator 70 generates a single-tone signal having a center frequency of 70 Hz.

As described above, when an impulse input signal having a center frequency of 70 Hz is outputted from the exciter 20, the seated person continues to feel the vibration for a time length of about 0.078 sec after the stop of output of the signal. Accordingly, to cause the seated person to feel a vibration in the front-left position on the seating portion 310 for a time length of 0.5 sec, it is necessary to maintain the signal level of a signal having a time length of 0.422 sec, which is (0.5 sec-0.078 sec), without limiting it and then to limit the signal level to zero for a time length of 0.078 sec.

For this reason, the signal generator 70 generates a signal that has a frequency of 70 Hz and whose signal level will be not limited but maintained for a time length of 0.422 sec after the start of output of the signal and then will be limited to zero (0 dB) for a time length of 0.078 sec, as an output signal having a second-half time length of 0.5 sec on the basis of the center frequency of 70 Hz and the vibration time of 0.078 sec read from the temporary memory.

After step S.36 or S.40, the signal generator 70 generates an output signal having a time length of 1.0 sec (entire output signal) by connecting the generated output signal having a second-half time length of 0.5 sec to the end of the generated output signal having a first-half time length of 0.5 sec (S.41).

Figure 9A:
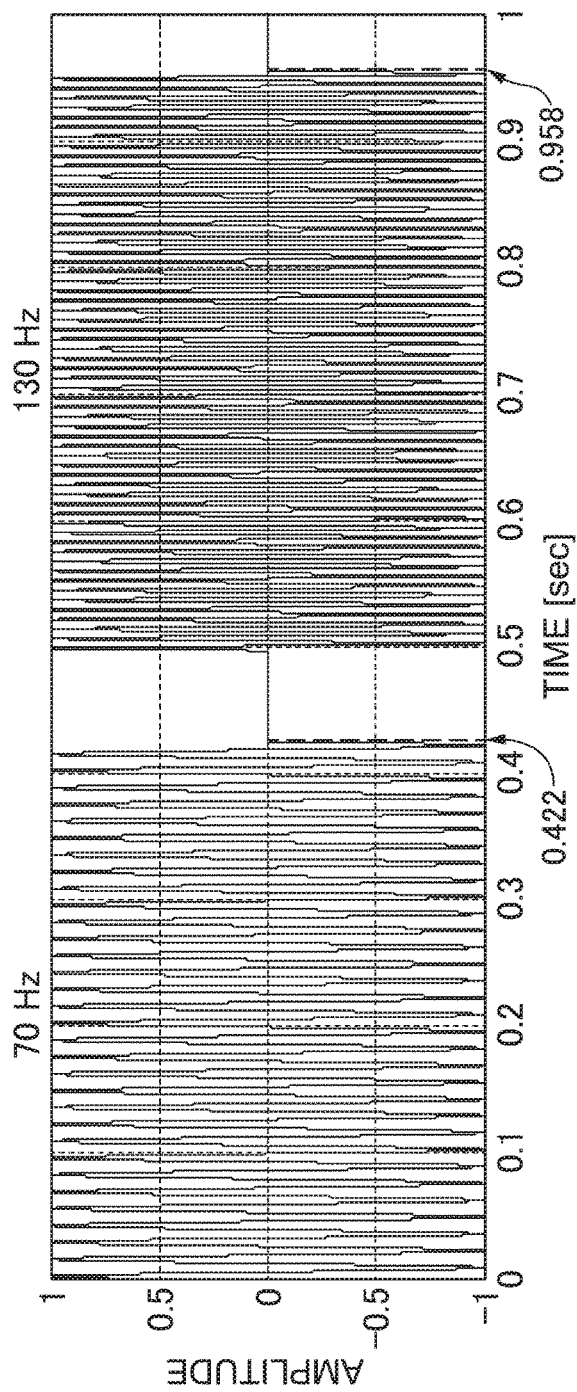
FIG. 9(a) is a diagram showing an entire output signal generated by connecting an output signal for vibrating the rear-left position to the end of an output signal for vibrating the front-left position.
Figure 9B:
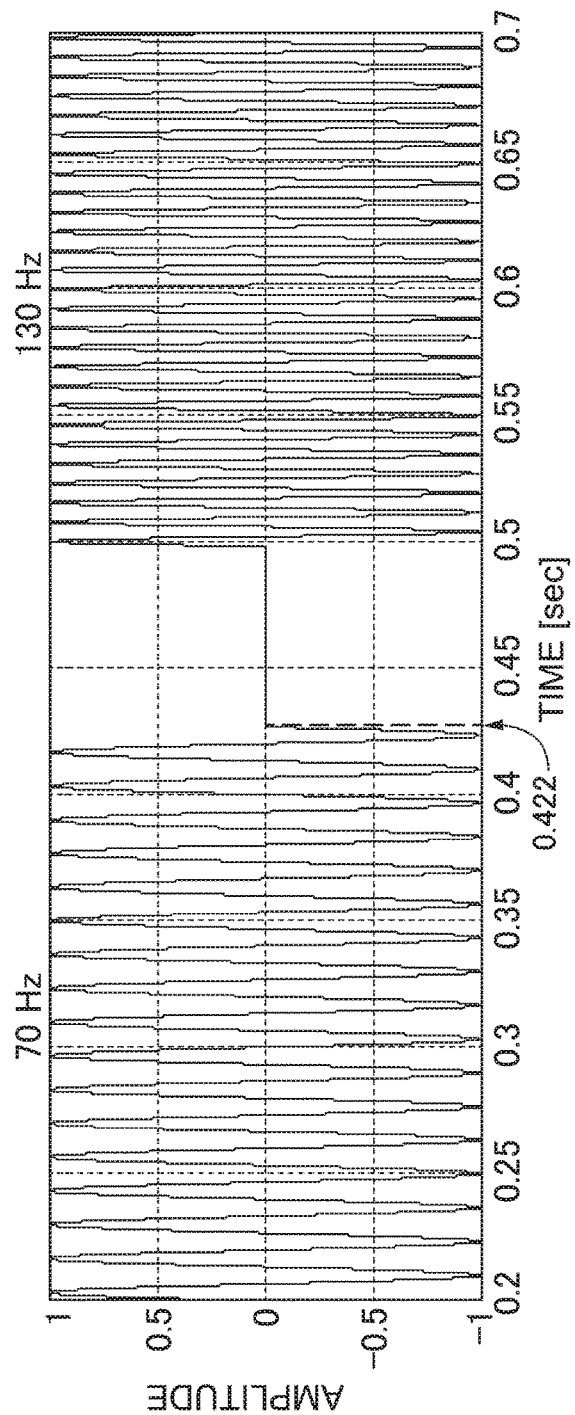
FIG. 9(b) is an enlarged view of the junction of the first-half signal and second-half signal.

FIG. 9(*a*) is a graph showing the entire output signal generated by connecting the second-half output signal for vibrating the rear-left position to the end of the first-half output signal for vibrating the front-left position. FIG. 9(*b*) is an enlarged view of the junction of the first-half signal and second-half signal. As is evident in FIG. 9(*a*), the first-half (0 sec to 0.5 sec) signal is outputted as a sine wave having a frequency of 70 Hz from 0 sec until 0.422 sec and then maintains its amplitude at 0 from 0.422 sec until 0.500 sec (for a time length of 0.078 sec). The second-half (0.5 sec to 1.0 sec) signal is outputted as a sine wave having a frequency of 130 Hz from 0.5 sec until 0.958 sec, which is (0.5 sec+0.458 sec), and then maintains its amplitude at 0 from 0.958 sec until 1.000 sec (for a time length of 0.042 sec).

Figure 10:
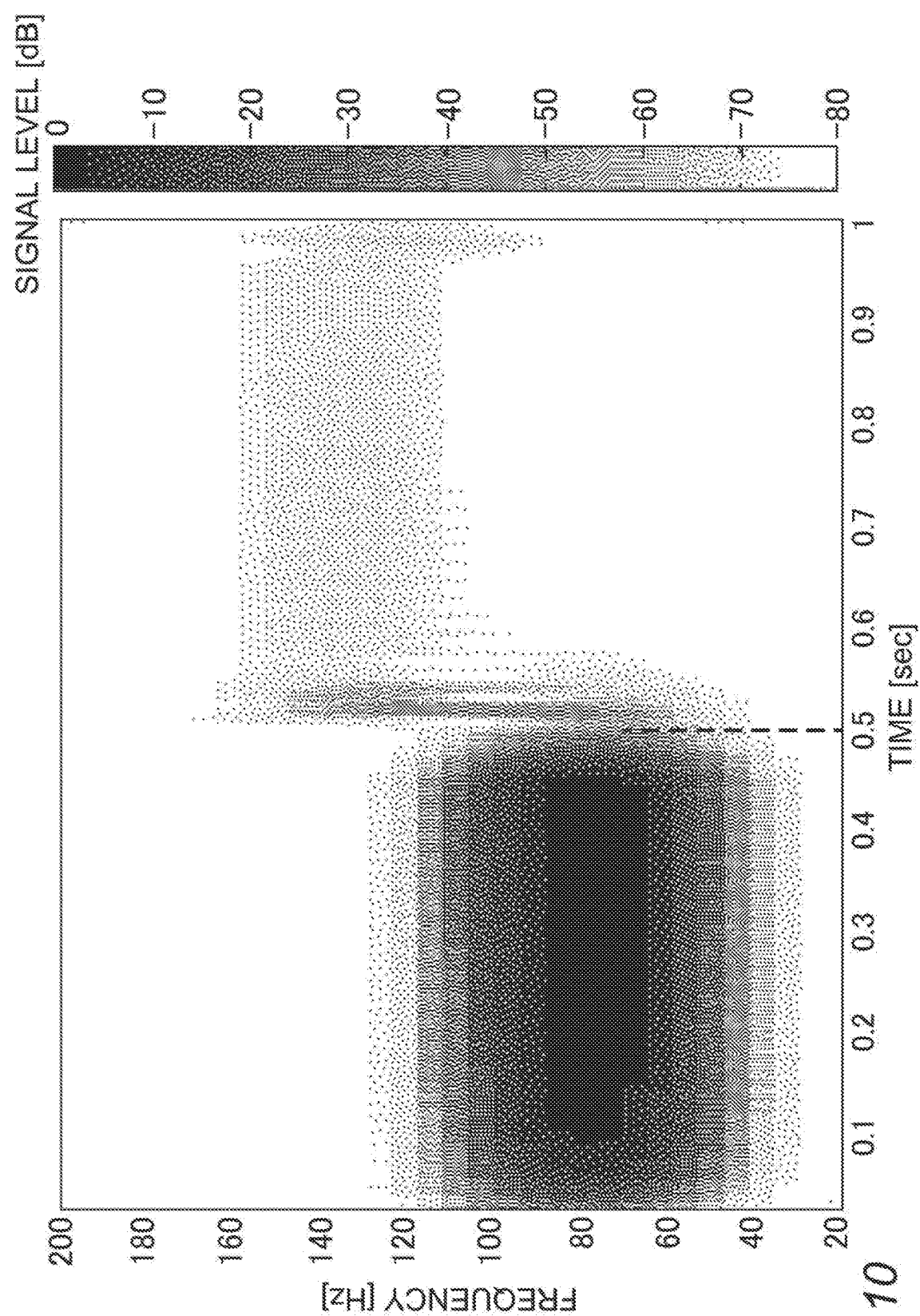
FIG. 10 is a graph showing a spectrogram of the vibration state detected by the pickup installed on the front-left position of the seating portion.

FIG. 10 is a vibration-state spectrogram obtained when the output signal having a time length of 1.0 sec shown in FIG. 9(a) is outputted from the exciter 20 as a vibration and measured by the pickup 40 installed on the front-left position of the seating portion 310. As described above, in its first-half, the output signal having a time length of 1.0 sec is outputted as a sine wave having a frequency of 70 Hz from 0 sec until 0.422 sec and then maintains its amplitude at 0 from 0.422 sec until 0.500 sec (for a time length of 0.078 sec). However, as shown in FIG. 10, even after 0.422 sec, at which the output of the signal has been stopped, a vibration of −25 dB or more is detected on the front-left position of the seating portion 310 until a lapse of about 0.5 sec. For this reason, when causing the seated person to feel a vibration having a time length of 0.5 sec on the front-left position of the seating portion 310, the vibration output time is not set to 0.5 sec but rather the output of the signal is stopped at 0.422 sec considering the remainder of the vibration feeling. Thus, the seated person can be caused to feel the vibration having a first-half time length of 0.5 sec.

On the other hand, as the second-half output signal, a signal having a frequency of 130 Hz is inputted to the exciter 20. However, as shown in FIG. 5, even if a vibration of 130 Hz is inputted, a vibration of −25 dB or more does not occur the front-left position of the seating portion 310. Thus, as is evident in FIG. 10, the seated person does not feel a vibration on the front-left position of the seating portion 310 after a lapse of 0.5 sec.

Figure 11:
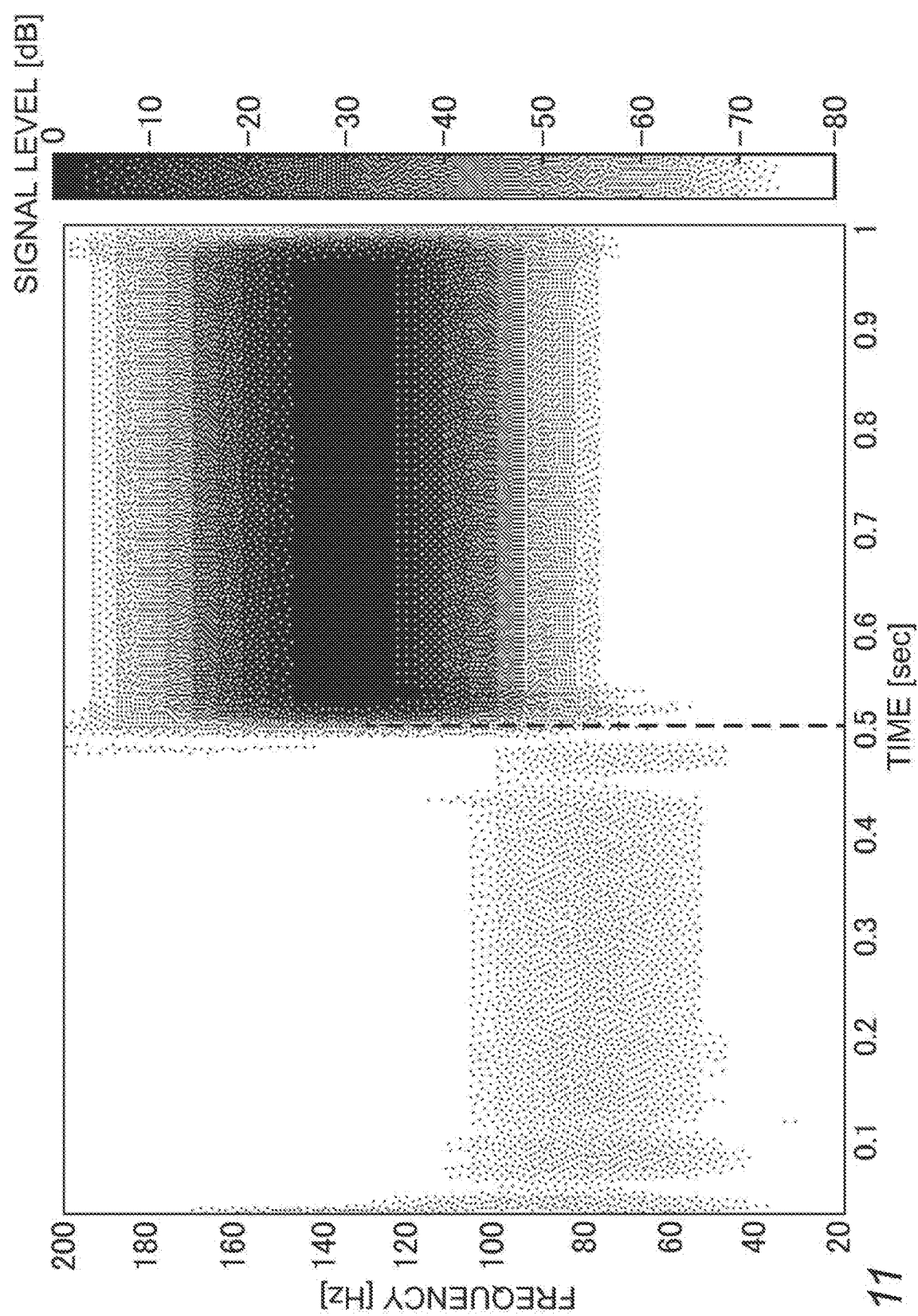
FIG. 11 is a graph showing a spectrogram of the vibration state detected by the pickup installed on the rear-left position of the seating portion.

FIG. 11 is a vibration-state spectrogram obtained when the output signal having a time length of 1.0 sec shown in FIG. 9(a) is outputted from the exciter 20 as a vibration and measured by the pickup 40 installed on the rear-left position of the seating portion 310. As described above, in its first-half, the output signal having a time length of 1.0 sec is outputted as a sine wave having a frequency of 70 Hz from 0 sec until 0.422 sec. However, as shown in FIG. 6, a vibration of −25 dB or more does not occur on the rear-left position of the seating portion 310. Thus, as is evident in FIG. 11, the seated person does not feel a vibration on the rear-left position of the seating portion 310 from 0 sec until 0.5 sec.

On the other hand, as the second-half output signal, a signal having a frequency of 130 Hz is inputted to the exciter 20. In this case, the second-half output signal having a time length of 0.5 sec is outputted as a sine wave having a frequency of 130 Hz from 0.5 sec until 0.958 sec and then maintains its amplitude at 0 from 0.958 sec until 1.000 sec (for a time length of 0.042 sec). However, as shown in FIG. 11, even after 0.958 sec, at which the output of the signal has been stopped, a vibration of −25 dB or more is detected in the rear-left position of the seating portion 310 until about 1.0 sec. As seen above, when causing the seated person to feel a vibration having a time length of 0.5 sec (from 0.5 sec until 1.0 sec) on the rear-left position of the seating portion 310, the vibration output time is not set to 1.0 sec but rather the output of the signal is stopped at 0.958 sec considering the remainder of the vibration feeling. Thus, the seated person can be caused to feel the second-half vibration having a time length of 0.5 sec.

As seen above, the measurement signals whose output can be measured in a wide frequency range, such as TSP signals or maximum length sequence codes, are outputted from the exciter 20 as vibrations, and the frequencies having a high vibration level are measured by the pickups 40 installed on the respective positions of the seating portion 310. By measuring frequencies having a high vibration level such a manner, the frequencies that allow the respective positions of the seating portion 310 to be vibrated can be identified. As a result, even the vibration generation device 200, which includes the vibration transmission member 30 embedded inside the seating portion 310 so as to extend approximately horizontally in the seating portion 310 and is configured to cause the seated person to feel a vibration through the vibration transmission member 30, is able to vibrate desired positions. That is, by outputting, from the exciter 20, output signals having frequencies suitable to the desired positions, the vibration positions on the seating portion 310 can be controlled.

As described as an example in the present embodiment, the vibration transmission member 30 is vibrated using the signal having the frequency that allows for vibration of the front position and then vibrated using the signal having the frequency that allows for vibration of the rear position. Thus, the position in which the seated person feels a vibration can be moved from the front side to the rear side, that is, an alarm or the like can be giver to the seated person using a vibration that gives a feeling of movement.

Also, the time during which the seated person continues to feel the vibration is obtained from the impulse response detected from the measurement signal. Thus, the time during which the seated person can feel the vibration after the stop of output of the signal can be obtained as vibration time information. Also, although the vibration time information varies among the positions of the seating portion 310, it is preferable to have the seated person to continue to feel the vibrations in the respective positions for the same time length. For this reason, there is generated an output signal having a time during which the signal level is not limited but maintained and a time during which the signal level is limited to zero (0 dB). By using the output signal thus generated, the vibrations can be adjusted so that the seated person can feel the vibrations in the respective positions for the same time length although the vibration time information varies among the positions of the seating portion 310.

Also, a vibration intensity that makes the seated person aware of an alarm or the like based on a vibration even during travel of the vehicle is detected on the basis of the vibration characteristics measured by the respective positions on the seating portion 310. This allows obtaining a frequency range that allows the seated person to surely feel vibrations that occur in the respective positions of the upper surface of the seating portion 310. Thus, by adjusting the frequency of output signals serving as vibrations to be outputted from the exciter 20, the different positions on the seating portion 310 can be vibrated with intensities that allow the seated person to surely feel the vibrations.

While the vibration generation device and vibration generation method according to one embodiment of the present invention have been described in detail using the drawings and the vibration generation device 200 as an example, the vibration generation device and vibration generation method according to the present invention are not limited to the example described in the embodiment.

The vibration generation device 200 according to the present embodiment has been described above assuming that a signal having a frequency of 70 Hz showing the highest signal level is generated as an output signal for vibrating the front-left position on the seating portion 310. However, as shown in FIG. 5, the frequency showing a signal level of −25 dB or more that allows the seated person to surely feel a vibration on the front-left position of the seating portion 310 is not limited to 70 Hz. For example, a signal having any frequency component of 40 Hz to 100 Hz is able to vibrate the from the left position on the seating portion 310 with a vibration having a signal level of −25 dB or more. Accordingly, an output signal for vibrating the front-left position on the seating portion 310 is not limited to an output signal of 70 Hz. By using a signal having any frequency in a frequency range of 40 Hz to 100 Hz, an effective vibration can be occurred.

Similarly, by using a signal including any frequency component in a frequency range of 100 Hz to 160 Hz as shown in FIG. 6, the rear-left position on the seating portion 310 can be vibrated with a vibration of −25 dB or more. Thus, by using a signal including any frequency component in a frequency range of 100 Hz to 160 Hz as an output signal for vibrating the rear-left position on the seating portion 310, an effective vibration can be occurred.

Also, in the present embodiment, the case in which the single-tone signals of 70 Hz and 130 Hz are used as output signals has been described. However, as described above, by using a signal having any frequency in a frequency range of 40 Hz to 100 Hz, the front-left position on the seating portion 310 can be vibrated effectively. For this reason, a sweep signal whose frequency is changed in a frequency range of 40 Hz to 100 Hz may also be used as an output signal. Even if such a sweep signal is used, a vibration signal level (vibration level) of −25 dB or more can be exhibited, that is, an effective vibration can be occurred.

Similarly, by using a sweep signal whose frequency is changed in a frequency range of 100 Hz to 160 Hz, as an output signal, the rear-left position on the seating portion 310 can be vibrated effectively.

In particular, by outputting a vibration from the exciter 20 using a sweep signal as an output signal, the magnitude (intensity) of a vibration that the seated person feels can be continuously changed, thereby avoiding the vibration from becoming monotonous.

Also, the intensity (dB) of a vibration for vibrating the front-left position can be obtained for each frequency value from the vibration characteristics of the front-left position of the seating portion 310 shown in FIG. 5, and the intensity (dB) of a vibration for vibrating the rear-left position can be obtained for each frequency value from the vibration characteristics of the rear-left position of the seating portion 310 shown in FIG. 6. Accordingly, by adjusting the frequency value of the output signal for vibrating the front-left position on the seating portion 310 and the frequency value of the output signal for vibrating the rear-left position thereon so that the vibrations exhibit the same intensity, the front-left position and rear-left position on the seating portion 310 can be vibrated.

Also, by adjusting the frequency value of the output signal for vibrating the front-left position on the seating portion 310 and the frequency value of the output signal for vibrating the rear-left position thereon, the intensity of the vibration for vibrating the front-left position on the seating portion 310 can be made higher or lower than the intensity of the vibration for vibrating the rear-left position thereon.

Also, the vibration generation device 200 according to the embodiment of the present invention has been described above assuming that the vibration transmission member 30 is installed inside the seating portion 310 of the vehicle seat 300 and the respective positions on the seating portion 310 are vibrated. However, the vibration transmission member 30 need not necessarily be installed in the seating portion 310 of the vehicle seat 300. For example, the vibration transmission member 30 may be installed inside the backrest of the vehicle seat 300 rather than inside the seating portion 310 so that the seated person feels a vibration on the backrest. Even if the vibration transmission member 30 is installed inside a portion other than the seating portion 310 of the vehicle seat 300 as described above, the seated person can be caused to recognize an alarm based on a vibration.

REFERENCE SIGNS LIST 1 vehicle notification system
10 measurement signal generator
20 exciter (vibration generator)
30 vibration transmission member
40 pickup
50 vibration recorder
60 vibration analyzer
70 signal generator (output signal generator)
80 memory (frequency information recorder, vibration time information recorder)
100 vibration analysis device
200 vibration generation device
300 vehicle seat (seat)
310 seating portion

The invention claimed is:

1. A vibration generation device comprising:
a vibration generator configured to generate a vibration having a frequency corresponding to a frequency of an inputted signal;
a vibration transmission member installed inside a seat and configured to transmit a vibration in an extending direction thereof;
a frequency information recorder configured to record frequency values of measurement signals such that the frequency values are associated with measurement positions of vibrations on the seat originally generated by the vibration generator on the basis of the measurement signals and transmitted to the seat by the vibration transmission member; and
an output signal generator configured to obtain a frequency value of a measurement position corresponding to a desired position on the seat from the frequency information recorder and to generate an output signal having the frequency value, wherein
the vibration generator generates a vibration on the basis of the output signal and transmits a generated vibration to the vibration transmission member so that the desired position on the seat vibrates.

2. The vibration generation device according to claim 1, wherein
the output signal generator obtains a frequency value of a measurement position corresponding to one desired position as a first frequency value from the frequency information recorder and generates a first output signal having the first frequency value, as well as obtains a frequency value of a measurement position corresponding to another desired position as a second frequency value from the frequency information recorder and generates a second output signal having the second frequency value, and
the vibration generator changes a vibration position on the seat from the one desired position to the another desired position by transmitting a vibration generated on the basis of the first output signal to the vibration transmission member and then transmitting a vibration generated on the basis of the second output signal to the vibration transmission member.

3. The vibration generation device according to claim 1, further comprising a vibration time information recorder configured to record a time during which a seated person continues to feel a vibration on the seat caused by an impulse response generated by using an impulse input signal as a measurement signal, as a vibration time such that the vibration time is associated with a measurement position on the seat in which the vibration has been measured, wherein the output signal generator obtains a vibration time of a measurement position corresponding to the desired position on the seat from the vibration time information recorder and generates an output signal whose signal level is not limited from start of output of the signal until a lapse of a time obtained by subtracting the vibration time from a predetermined time and is limited to zero from immediately after a lapse of the time until a lapse of the vibration time.

4. A vibration generation device comprising:
a vibration generator configured to generate a vibration having a frequency corresponding to a frequency of an inputted signal;
a vibration transmission member installed inside a seat and configured to transmit a vibration in an extending direction thereof;
a frequency information recorder configured to record frequency ranges that allow measurement signals to generate vibrations exhibiting a predetermined vibration level or more on the seat, such that the frequency ranges are associated with measurement positions of the vibrations on the seat exhibiting the predetermined vibration level or more originally generated by the vibration generator on the basis of the measurement signals and transmitted to the seat by the vibration transmission member; and
an output signal generator configured to obtain a frequency range of a measurement position corresponding to a desired position on the seat from the frequency information recorder and to generate an output signal having any frequency in the frequency range, wherein
the vibration generator generates a vibration on the basis of the output signal and transmits a generated vibration to the vibration transmission member so that the desired position on the seat vibrates.

5. The vibration generation device according to claim 4, wherein
the output signal generator obtains a frequency range of a measurement position corresponding to one desired position as a first frequency range from the frequency information recorder and generates a first output signal having any frequency in the first frequency range, as well as obtains a frequency range of a measurement position corresponding to another desired position as a second frequency range from the frequency information recorder and generates a second output signal having any frequency in the second frequency range, and
the vibration generator changes a vibration position on the seat from the one desired position to the another desired position by transmitting a vibration generated on the basis of the first output signal to the vibration transmission member and then transmitting a vibration generated on the basis of the second output signal to the vibration transmission member.

6. The vibration generation device according to claim 4, wherein the predetermined vibration level is a minimum vibration level that allows a seated person on the seat to feel the vibration.

7. A vibration generation method performed by a vibration generation device in which a vibration generator configured to generate a vibration having a frequency corresponding to a frequency of an inputted signal generates a vibration and transmits a generated vibration to a vibration transmission member installed inside a seat and configured to transmit a vibration in an extending direction thereof so that a desired position on the seat vibrates, the vibration generation method comprising:
a frequency information obtaining step of an output signal generator obtaining, from a frequency information recorder configured to record frequency values of measurement signals such that the frequency values are associated with measurement positions of vibrations on the seat originally generated by the vibration generator on the basis of the measurement signals and transmitted to the seat by the vibration transmission member, a frequency value of a measurement position corresponding to the desired position on the seat;
an output signal generation step of generating, by the output signal generator, an output signal having the frequency value obtained in the frequency information obtaining step; and
a vibration generation step of by the vibration generator, generating a vibration on the basis of the output signal and transmitting a generated vibration to the vibration transmission member so that the desired position on the seat vibrates.

8. The vibration generation method according to claim 7, wherein
the output signal generation step comprises the output signal generator obtaining a frequency value of a measurement position corresponding to one desired position as a first frequency value from the frequency information recorder and generating a first output signal having the first frequency value, as well as obtaining a frequency value of a measurement position corresponding to another desired position as a second frequency value from the frequency information recorder and generating a second output signal having the second frequency value, and
the vibration generation step comprises the vibration generator changing a vibration position on the seat from the one desired position to the another desired position by transmitting a vibration generated on the basis of the first output signal to the vibration transmission member and then transmitting a vibration generated on the basis of the second output signal to the vibration transmission member.

9. The vibration generation method according to claim 7, further comprising a vibration time information obtaining step of the output signal generator obtaining, from a vibration time information recorder configured to record a time during which a seated person continues to feel a vibration on the seat caused by an impulse response generated by using an impulse input signal as a measurement signal, as a vibration time such that the vibration time is associated with a measurement position on the seat in which the vibration has been measured, a vibration time of a measurement position corresponding to the desired position on the seat, wherein
the output signal generation step comprises generating, by the output signal generator, an output signal whose signal level is not limited from start of output of the signal until a lapse of a time obtained by subtracting the vibration time obtained in the vibration time information obtaining step from a predetermined time and is limited to zero from immediately after a lapse of the time until a lapse of the vibration time.

10. A vibration generation method performed by a vibration generation device in which a vibration generator configured to generate a vibration having a frequency corresponding to a frequency of an inputted signal generates a vibration and transmits a generated vibration to a vibration transmission member installed inside a seat and configured to transmit a vibration in an extending direction thereof so that a desired position on the seat vibrates, the vibration generation method comprising:

a frequency information obtaining step of an output signal generator obtaining, from a frequency information recorder configured to record frequency ranges that allow measurement signals to generate vibrations exhibiting a predetermined vibration level or more on the seat, such that the frequency ranges are associated with measurement positions of the vibrations on the seat exhibiting the predetermined vibration level or more originally generated by the vibration generator on the basis of the measurement signals and transmitted to the seat by the vibration transmission member, a frequency range of a measurement position corresponding to the desired position on the seat;

an output signal generation step of generating, by the output signal generator, an output signal having any frequency in the frequency range obtained in the frequency information obtaining step; and a vibration generation step of by the vibration generator, generating a vibration on the basis of the output signal and transmitting a generated vibration to the vibration transmission member so that the desired position on the seat vibrates.

11. The vibration generation method according to claim 10, wherein the output signal generation step comprises the output signal generator obtaining a frequency range of a measurement position corresponding to one desired position as a first frequency range from the frequency information recorder and generating a first output signal having any frequency in the first frequency range, as well as obtaining a frequency range of a measurement position corresponding to another desired position as a second frequency range from the frequency information recorder and generating a second output signal having any frequency in the second frequency range, and the vibration generation step comprises the vibration generator changing a vibration position on the seat from the one desired position to the another desired position by transmitting a vibration generated on the basis of the first output signal to the vibration transmission member and then transmitting a vibration generated on the basis of the second output signal to the vibration transmission member.

12. The vibration generation method according to claim 10, wherein the predetermined vibration level is a minimum vibration level that allows a seated person on the seat to feel the vibration.

* * * * *